(12) United States Patent
Ichimura et al.

(10) Patent No.: US 6,456,416 B1
(45) Date of Patent: Sep. 24, 2002

(54) PROCESS AND DEVICE FOR PRODUCING PHOTONIC CRYSTAL, AND OPTICAL ELEMENT

(75) Inventors: Kouichi Ichimura, Yokohama (JP); Toshiro Hiraoka, Yokohama (JP)

(73) Assignee: Kabushiki Kaisha Toshiba, Kawasaki (JP)

(*) Notice: Subject to any disclaimer, the term of this patent is extended or adjusted under 35 U.S.C. 154(b) by 0 days.

(21) Appl. No.: 09/667,831

(22) Filed: Sep. 22, 2000

(30) Foreign Application Priority Data

Sep. 24, 1999 (JP) .......................................... 11-271378
Sep. 30, 1999 (JP) .......................................... 11-280043

(51) Int. Cl.$^7$ .............................. G02F 1/03; G21K 5/10
(52) U.S. Cl. ....................... 359/241; 359/321; 359/586; 250/492.22
(58) Field of Search ................................ 359/241, 321, 359/586, 579; 250/492.22; 264/1.1, 437; 430/270.1; 385/5, 122; 428/105

(56) References Cited

U.S. PATENT DOCUMENTS

| | | | | |
|---|---|---|---|---|
| 5,245,466 A | * | 9/1993 | Burns et al. ................. | 359/296 |
| 5,600,483 A | * | 2/1997 | Fan et al. ...................... | 257/17 |
| 6,366,392 B1 | * | 4/2002 | Tokushima ................. | 359/321 |
| 6,392,787 B1 | * | 5/2002 | Cirelli et al ................ | 359/248 |
| 6,396,617 B1 | * | 5/2002 | Scalora ........................ | 359/248 |
| 2002/0041425 A1 | * | 4/2002 | Baba et al. .................. | 359/322 |
| 2002/0051275 A1 | * | 5/2002 | Tokushima ................. | 359/241 |

FOREIGN PATENT DOCUMENTS

| | | | |
|---|---|---|---|
| EP | WO 96/36895 | * | 11/1996 |
| EP | WO 09/09439 | * | 2/1999 |
| JP | 10-059746 | | 3/1998 |
| JP | 10-083005 | | 3/1998 |
| JP | 10-090634 | | 4/1998 |

OTHER PUBLICATIONS

Satoru et al, "Photofabrication of photonic crystal using interference of UV laser," Proc. SPIE, Optical Engineering for Sensing and Nanotechnology 99, vol. 3740, Jun. 16–18, 1999, pp. 541–544.*

Berger et al, "Photonic band gaps and holography," Journal of Applied Physics, US American Institute of Physics, New York, vol. 82, No. 1, Jul. 1, 1997, pp. 60–64.*

Lerondel et al, "Porous silicon lateral superlattices," Journal of Applied Physics, US, American Institute of Physics, New York, vol. 71, No. 2, Jul. 14, 1997, pp. 196–198.*

(List continued on next page.)

Primary Examiner—Evelyn A Lester
(74) Attorney, Agent, or Firm—Oblon, Spivak, McClelland, Maier & Neustadt, P.C.

(57) ABSTRACT

There is provided a process for producing an optical element comprising a photonic crystal in which spots having different indices are arranged periodically, comprising the step of exposing an optical medium whose refractive index changes by irradiation of light or by a predetermined treatment conducted after the irradiation of light according to the intensity of the applied light to a field where light intensity changes in space at a period of the wavelength order of light and holding the optical medium for a given time, and the step of repeating at least once the step of creating another field where light intensity changes in space at a period of the wavelength order of light by shifting the optical medium. Further, by using a plurality of optical media whose refractive indices change by an external field, the refractive indices of certain two media out of these optical media are caused to be the same or about the same under a certain external field condition. By reflecting the distribution patterns that light senses under these two conditions on a desired crystal structure, shape of a lattice point and period, there can be provided an optical element and an optical demultiplexer that are capable of dynamically switching between two significantly different photonic structures by switching the external field conditions.

19 Claims, 21 Drawing Sheets

OTHER PUBLICATIONS

U.S. patent application Ser. No. 09/651,030, filed Aug. 30, 2000, pending.

U.S. patent application Ser. No. 09/588,721, filed Jun. 07, 2000, pending.

* cited by examiner $n_1(\nu_1, A_1) \neq n_2(\nu_1, A_1)$
$n_1(\nu_1, A_1) \neq n_3(\nu_1, A_1)$ $n_1(\nu_1, A_2) = n_2(\nu_1, A_2)$
$n_1(\nu_1, A_2) \neq n_3(\nu_1, A_2)$

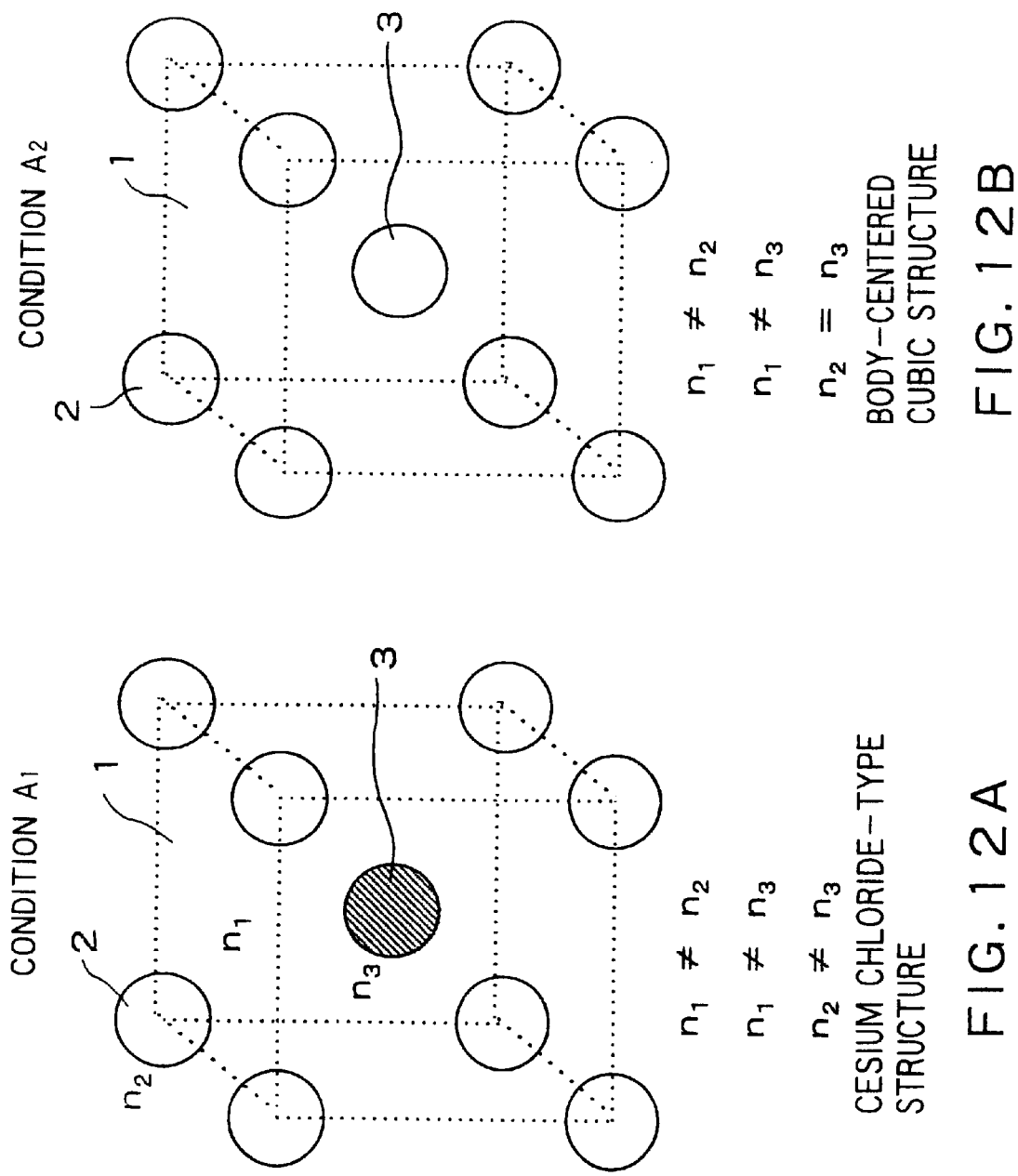

CONDITION A₁

$n_1 \neq n_2$ $n_2 \neq n_3$

FUNCTIONING AS
A WAVEGUIDE

CONDITION A₂

$n_1 \neq n_2$ $n_2 = n_3$

NOT FUNCTIONING
AS A WAVEGUIDE

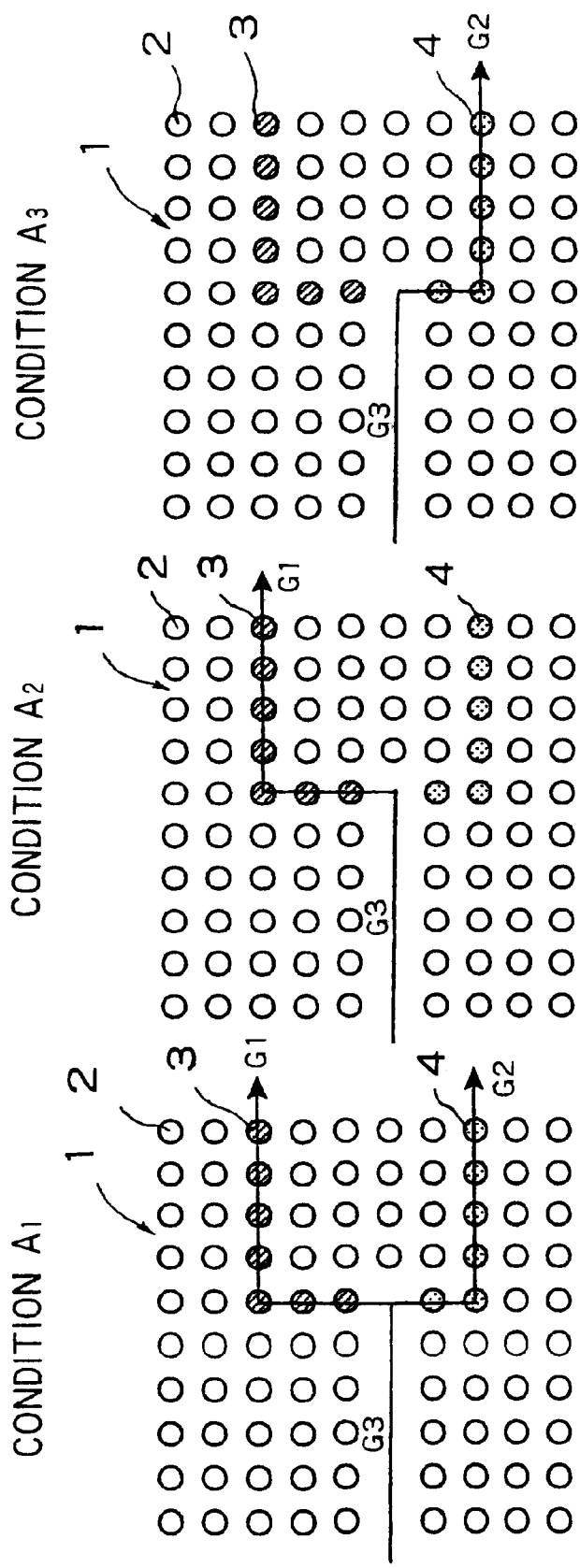

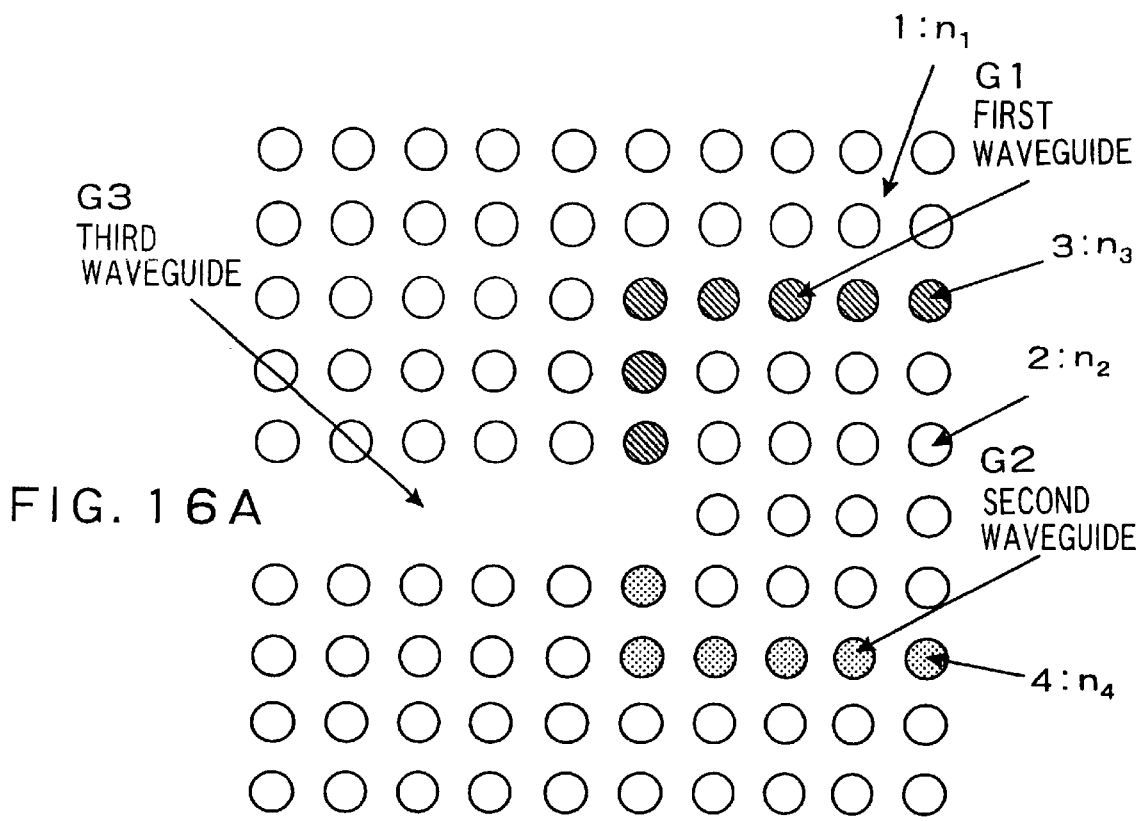
FIG. 16A
$$n_1(\nu_1, A_1) \neq n_2(\nu_1, A_1)$$
$$n_2(\nu_1, A_1) \neq n_3(\nu_1, A_1)$$
$$n_2(\nu_1, A_1) = n_4(\nu_1, A_1)$$
$$n_1(\nu_2, A_1) \neq n_2(\nu_2, A_1)$$
$$n_2(\nu_2, A_1) = n_3(\nu_2, A_1)$$
$$n_2(\nu_2, A_1) \neq n_4(\nu_2, A_1)$$
FIG. 16B
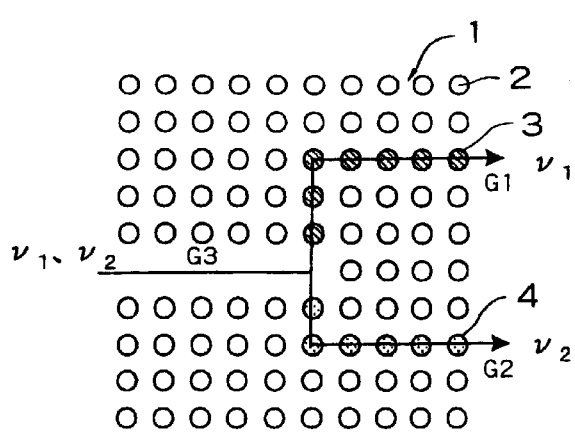

700nm

PROCESS AND DEVICE FOR PRODUCING PHOTONIC CRYSTAL, AND OPTICAL ELEMENT

BACKGROUND OF THE INVENTION

This invention relates to a process and a device for producing an optical element having a photonic-band structure, particularly an optical element comprising a three-dimensional photonic crystal having a desired crystal structure easily and in a short period of time, and it also relates to an optical element produced by using the process and the device.

Furthermore, the present invention relates to an optical element and an optical demultiplexer. More specifically, it relates to an active optical element and an optical demultiplexer that have achieved an optical switching function by changing a photonic-band structure by switching external fields such as light and an electric field in a photonic crystal.

In the structure called "photonic crystal" in which two types of optical media having different refractive indices are arranged periodically at a wavelength order of light, the relationship between the wave number of light and its frequency, i.e. photon energy, shows a band structure due to periodic changes in the refractive indices. This phenomenon is similar to the phenomenon that electron energy in a semiconductor shows a band structure in a periodic potential.

The photonic crystal is significantly characterized by its optical properties since it is capable of making the so-called "photonic-bandgap" in which light does not transmit in any directions (E. Yablonovitch, Phys. Rev. Lett. 58(20), 2059 (1987)) appear and has very high degrees of optical anisotropy and dispersibility. Thus, by taking advantage of such properties, there have been proposed the control of natural light and an optical waveguide, a polarizer and an optical demultiplexer that have a very small radius of curvature at the corner, and expectations are being raised about their applications to a variety of fields.

Heretofore, however, there has not been available an effective process for producing a photonic crystal, particularly a three-dimensional photonic crystal, in which the refractive indices have a periodic structure at the wavelength order of light, in the form of a crystal structure suitable for the application of an optical element. This has been a factor that hinders the commercialization of the photonic crystal and an optical element using the same.

To improve the above situation, there have recently been made several reports on the production of a photonic crystal at the wavelength order of light. Representative among them are on the following three processes.

(1) A process for producing a photonic crystal by removing a solvent from a colloidal solution containing silicon oxide fine particles to crystallize the silicon oxide fine particles. This process takes advantage of the self-arrangement of silicon oxide fine particles, and the photonic crystal produced is called "opal type". By this process, a crystal having a high repetition number can be produced relatively easily (H. Miguez et al., appl. Phys. Lett. 71(9), 1148(1997)). However, in this process, the silicon oxide fine particles are not arranged with high reproducibility and high reliability, and a crystal structure cannot be selected freely.

(2) Wood-Pile process (S. Noda et al. Jpn. J. Appl. Phys., 35, L909(1996)). In this process, by using a semiconductor micromachining technique, a structure comprising a plurality of arranged square timbers is formed on each of two substrates, the substrates are bonded to each other in such a manner that the square timbers on one substrate are faced at right angles with the square timbers on the other substrate, and one of the substrates is removed by etching to form a structure comprising two layers of "square timbers". Similarly, a substrate having "square timbers" arranged on the surface is prepared, and a layer of square timbers is piled up by repeating bonding with accurate positioning and etching. It has been found that a diamond structure which opens a photonic-bandgap in all directions can be formed by this process. This process, however, requires a micromachining process which is complicated and time-consuming, and there is a limit for the number of repeating periods that can be actually formed.

(3) A process called "autocloning" process (Kawakami et al., Japanese Patent Application Laid-Open No. 335758/1998). In this process, a two-dimensional, periodic convexoconcave pattern is formed on a substrate made of quartz or a semiconductor by lithography, and a number of thin films are laminated thereon while the underlying convexoconcave pattern is reproduced by bias sputtering. Thus, a three-dimensional periodic structure is formed both in the surface direction of the substrate on which the convexoconcave pattern has been engraved at the beginning and in the laminating direction perpendicular to the surface. This process is more reliable and more excellent in terms of reliability and reproducibility than the process for producing the opal-type photonic crystal, and does not require a micromachining process which is as complicated and time-consuming as that in the Wood-Pile process. Therefore, this process is capable of producing a photonic crystal which has a relatively large number of periods in the laminating direction. However, since it is inevitable in this process that concave portions come over the concave portions of the pattern of the underlying layer and convex portions come over the convex portions of the pattern of the underlying layer, this process can realize only specific types of crystal structures and therefore cannot attain arbitrary types of crystal structures. In fact, a photonic crystal having a perfect bandgap which opens in all directions cannot be formed by this process.

Other than the above three processes, there has been proposed a process for producing a photonic crystal by taking advantage of an interference pattern of light (Tsunetomo, Koyama, Japanese Patent Application Laid-Open No. 68807/1998). In this process, a laser beam is directed onto a number of thin films laminated one-dimensionally so as to bake the interference pattern on the films, and periodic incisions are made in a perpendicular direction on the surface of the multi-layer film by taking advantage of the fusion, evaporation and ablation occurring on portions where light intensity is high to form a photonic crystal. This process is considered to be an efficient process because it can form a number of periods at a time when a periodic structure is formed by using the interference pattern of a laser. However, even this process is limited in the types of crystal structures it can form.

As described above, the conventional process taking advantage of the self-arrangement of silicon oxide fine particles has problems associated with reliability and reproducibility.

Meanwhile, since other processes require that each layer be laminated with high accuracy to form the periods of a photonic crystal, even if they succeed in the formation of the photonic crystal, it takes long time, the number of repeating periods is limited, and a desired crystal structure cannot be formed freely.

Meanwhile, the application of such a photonic crystal has also been limited heretofore.

That is, except for the three examples that will be given below, the photonic crystal has been conventionally used as a "passive element", and they have been rarely proposed to be used as an "active element". In other words, most of the conventionally proposed photonic crystals are determined their optical properties by the refractive-index distribution fixed in space. Therefore, in an optical demultiplexer, for example, the wavelength (frequency) of light to be transmitted in a specific direction is fixed, and the frequency of light to be derived in a specific direction has not been able to be switched. It has also not been possible to dynamically switch the direction of light from one direction of a branch placed in a waveguide to the other direction thereof.

The following three proposals use a photonic crystal as an "active element" having a switching function.

(4) One of the proposals uses a photonic crystal in which an ultrasonic generator or a thermoregulator for disturbing its periodicity and braking its band structure has been installed. It is intended by the installation of such devices to make appear or disappear the delaying effect of a photonic crystal to be used as a delay unit for light (Todori et al., Japanese Patent Application Laid-open No. 83005/1998).

(5) Another proposal uses a one-dimensional photonic crystal that has an electrooptic material sandwiched between diffraction gratings having a metal film formed on the surface facing the other grating. By applying a voltage between the metal films, the refractive index of the electrooptic material changes and the position of the bandgap in a one-dimensional direction changes, whereby the transmission of light having a wavelength near the end of the band can be made ON/OFF (Todori et al., Japanese Patent Application Laid-Open No. 83005/1998).

(6) In the third proposal, a photonic crystal containing a semiconductor as its constituent is irradiated with circularly-polarized light as controlling light to change the distribution of spins in the photonic crystal material, i.e., complex refractive index thereof, whereby the photonic-band structure changes, with the result that switching of light transmitting the photonic crystal is achieved (Takeuchi, Nishikawa, Japanese Patent Application Laid-Open No. 90634/1998).

However, the above three proposals still have problems to be solved with regard to the following points.

That is, the above proposal (4) merely switches between the appearance and the disappearance of the function as the photonic crystal, and does not change actively the manner in which the function as the photonic crystal appears. Therefore, it cannot be used for controlling the direction in an optical demultiplexer or the branching in an optical waveguide.

The above proposal (5), due to its structure, can only apply to a one-dimensional photonic crystal, and cannot apply to a two-dimensional or three-dimensional photonic crystal having high dispersibility and excellent properties as waveguides.

The above proposal (6) changes the band structure by changing the complex refractive indices of the optical media constituting the photonic crystal, and cannot change the periodicity and symmetry of the photonic crystal. Therefore, it cannot induce a change in a large band structure.

As described above, the conventional photonic crystals, even when imparted with an active function, have been limited to the action of selecting whether the function itself as the photonic crystal should appear or disappear, in the number of dimensions of the photonic crystal capable of switching and to a particular controllable range. In either case, the prior arts use a process of changing only the refractive indices of optical materials of different types without changing distributions thereof, cannot switch the crystal structure and periodicity of the photonic crystal, and cannot change the structure of a photonic-band freely and dynamically.

Meanwhile, it is known that in the case where a bandgap occurs in the photonic crystal, when the spots of a photonic crystal in which periodicity is irregular are continued one-dimensionally, light is trapped within only these spots, thereby forming a fine optical waveguide that can stand sharp bending which has not been conventionally achieved (Attila Mekis et al., Phys. Rev. Lett. 77, 3787 (1996)). If a branch can be placed in such a fine optical waveguide to switch the direction of light according to its wavelength, the waveguide itself functions as an optical demultiplexer, whereby an optically functional element that is extremely useful in the integration in optical communications and optical circuits and in the simplification of production process thereof can be formed.

However, in the above prior arts, for any wavelength of light in the waveguide, the same spots in the photonic crystal always exhibit irregular periodicity, that is, they function as a waveguide. Thus, it has not been possible to use the above-described fine waveguide itself in the photonic crystal as an optical demultiplexer that functions according to wavelength.

As specifically described above, conventionally, the locations of those spots having different refractive indices, that is, the patterns of spatial changes in refractive indices, have been fixed in space and, therefore, there has been a limit to the range of change in the band structure. As a result, it has not been possible to change the band structure freely, significantly and dynamically for the active use of the photonic crystal.

That is, a technique to attain an optical element using an active photonic crystal has not been known heretofore. Further, a technique to use a fine waveguide itself in a photonic crystal as an optical demultiplexer has not been known heretofore, either.

SUMMARY OF THE INVENTION

It is the first object of the present invention to provide a novel process and a novel production device that can produce a three-dimensional photonic crystal having a period of a wavelength order of light in the form of any crystal structure with ease and a short period of time without going through the step of laminating layers of "crystal" with accuracy as in the conventional process; and an optical element produced by the process and the device.

It is the second object of the present invention to provide a novel optical element that can control the band structure of a photonic crystal freely, significantly and dynamically, particularly an optical element that can control the band structure of a photonic crystal by changing the distribution pattern of complex refractive index or periodicity itself; and a novel optical demultiplexer using the waveguides in the photonic crystal.

First of all, the production process of the optical element of the present invention is a process for producing an optical element comprising a photonic crystal in which spots having different refractive indices are arranged periodically, which comprises the step of placing an optical medium, whose refractive index changes by irradiation of light or by conducting predetermined treatment after the irradiation of light according to the intensity of the applied light, in a field where light intensity changes at a period of the wavelength order of light in space and keeping the medium therein for a given time; and the step of repeating at least once the step of changing the position of the optical medium and having the above field acted on the medium again.

As the optical medium used in the present invention, there can be used one whose refractive index changes, according to the intensity of applied light, by setting the medium aside for a given time after irradiation of light, or by subjecting the medium to heat treatment, irradiation of electromagnetic wave or corpuscular radiation, or treatment with chemicals after the irradiation of light.

In the process of the present invention, the optical field where light intensity changes at a period of the wavelength order of light in space is created, for example, by interference of a laser beam. To shift the position of the optical medium for a minute distance of the wavelength order of light, a piezo element-incorporated stage that can shift the optical medium in three directions of x, y and z is used, for example.

The production device of the optical element of the present invention comprises an optical system that creates an optical field where light intensity changes in space at a period of the wavelength order of light, and a movable stage that keeps an optical medium whose refractive index changes according to the intensity of applied light in the optical field where light intensity changes periodically and that can shift the optical medium for a minute distance of the wavelength order of light in the field.

The production device of the optical element of the present invention may further comprise a light source and a detector for evaluating the optical element produced.

The optical element of the present invention that is produced by the above process and the above device is an optical element comprising a photonic crystal in which spots having different refractive indices are arranged periodically, wherein a spot with a certain refractive index which constitutes the photonic crystal is located at a lattice point of a desired crystal structure; the refractive index distribution of an optical medium located at each lattice point has a shape having projections or bulges in the directions of three different axes; the crystal structure is not a simple lattice or the shape of the refractive index distribution of an optical medium located at each lattice point is not isotropic; and the refractive index distributions of optical media located at the lattice points together forming a simple lattice have the same shape and direction.

Meanwhile, the optical element of the present invention has a structure comprising the first optical medium in which the second optical medium and the third optical medium are periodically arranged at an interval of the wavelength order of incident light. In the optical element, the relative relationship among the refractive indices of the first to third, that is, the first, the second and the third optical media is changed by changing the external field condition applied to the above structure, whereby the periodicity of the spacial distribution of the refractive indices formed in the above structure can be changed.

The phrase "wavelength order of light" as used herein indicates an interval of about the same order as the wavelength of light. The interval is not significantly different from the wavelength of light, as exemplified by at least several tens of times or at most several tenths of the wavelength.

To describe the above constitution more specifically, the optical element of the present invention has a one-dimensional, two-dimensional or three-dimensional structure in which at least three types of optical media are arranged periodically. Optical materials, temperature and external field conditions are selected so that the refractive indices of at least two optical media should be different from each other to the frequency of incident light. By the application of electric field, magnetic field or pressure or the irradiation of light to the structure, or by a change in the electric field, magnetic field or pressure applied to the structure, a change in the intensity or wavelength of applied light or a change in the temperature of the structure, a combination of optical media having the largest refractive index difference change in the frequency of light inputted in the structure, or new spots having different refractive indices from the existing spots appear periodically, that is, a new periodic structure is formed after the change, or the relative ratio of the periodic peaks of the refractive indices of the media which occur in the structure changes, so that a new band structure appears in the wavelength range associated with incident light.

As for the usage form of the optical element, in the structure of the optical element, since the refractive index of the first optical medium and that of the third optical medium are substantially the same and the refractive index of the first optical medium and that of the second optical medium are substantially different to light having a given wavelength under the first external field condition, the light having a given wavelength is modulated by the periodic arrangement of the second optical medium, whereas since the refractive index of the first optical medium and that of the second optical medium are substantially the same and the refractive index of the first optical medium and that of the third optical medium are substantially different to the light having a given wavelength under the second external field condition different from the first external field condition, the light having a given wavelength is modulated by the periodic arrangement of the third optical medium.

To describe it more specifically, when the structure having a periodic structure is constituted by three types of optical media, which are each defined as the first optical medium, the second optical medium and the third optical medium and whose refractive indices are each defined as the first refractive index, the second refractive index and the third refractive index, the distribution of each of the first, the second and the third optical media in the structure has a periodic structure. In the above structure, since the refractive index of the first optical medium and that of the third optical medium are about the same and the refractive index of the first optical medium and that of the second optical medium are different in the wavelength of light inputted to the optical element, that is, the difference between the first refractive index and the second refractive index is larger than the difference between the first refractive index and the third refractive index, the periodic structure of the refractive index by which incident light is modulated in the structure is determined mainly by the periodic distribution of the second medium. Further, by the application of electric field, magnetic field or pressure or the irradiation of light to the structure, or by a change in the electric field, magnetic field or pressure applied to the structure, a change in the intensity or wavelength of applied light or a change in the temperature of the structure, the refractive index of the first medium and that of the second medium become about the same and the refractive index of the first medium and that of the third medium become different in the above wavelength, that is, the difference between the first refractive index and the third refractive index becomes larger than the difference between the first refractive index and the second refractive index, whereby the periodic structure of the refractive index by which incident light is modulated in the structure is determined mainly by the periodic distribution of the third medium instead, so that a new band structure appears in the wavelength range associated with incident light.

Further, the third optical element of the present invention has a structure comprising the first optical medium, the second optical medium arranged periodically in the first optical medium, and the third optical medium which has been substituted for and arranged in continuous spots of the periodic structure that should be formed by the second optical medium in the first optical medium. In this third optical element, since the complex refractive index of the second optical medium and the complex refractive index of the third optical medium are substantially different to light having a given wavelength under the first external field condition, the continuous spots substituted by the third optical medium function as a waveguide to the light having a given wavelength, whereas since the complex refractive index of the second optical medium and the complex refractive index of the third optical medium are substantially the same to the light having a given wavelength under the second external field condition different from the first external field condition, the continuous spots substituted by the third optical medium do not function as a waveguide to the light having a given wavelength.

To describe it more specifically, the above third optical element has a two-dimensional or three-dimensional structure which comprises at least two types of optical media having different complex refractive indices and in which spots formed of the same type of optical medium are arranged periodically. The irregularities in the periodic structure of this structure exist as one-dimensionally continuous spots in the structure, and the one-dimensionally continuous spots function as an optical waveguide. When at least three types of optical media are used, three optical media out of these optical media are each defined as the first optical medium, the second optical medium and the third optical medium, and the complex refractive indices of the first, the second and the third optical media in the vicinity of the frequency ν of light to be inputted in this waveguide are each defined as the first complex refractive index, the second complex refractive index and the third complex refractive index, this structure has a two-dimensional or three-dimensional periodic structure formed of the second optical medium in the first optical medium, a portion of the two-dimensional or three-dimensional periodic structure formed of the second optical medium is substituted by the one-dimensionally continuous spots formed of the third medium, the first complex refractive index and the second complex refractive index are different and the second complex refractive index and the third complex refractive index are also different in the vicinity of the frequency of light inputted in this optical element, and the spots substituted by the third medium function as an optical waveguide. By the application of electric field, magnetic field or pressure or the irradiation of light to the structure, or by a change in the electric field, magnetic field or pressure applied to the structure, a change in the intensity or wavelength of applied light or a change in the temperature of the structure, the second complex refractive index and the third complex refractive index become about the same while the first complex refractive index and the second complex refractive index remain different in the vicinity of the frequency ν, whereby the spots substituted by the third medium do not function as the irregularities in the periodic structure to incident light and therefore the spots functioning as an optical waveguide disappear. Thus, this optical element is imparted with a waveguide having a switching function.

Further, the fourth optical element of the present invention has a structure comprising the first optical medium, the second optical medium arranged periodically in the first optical medium, the third optical medium which has been substituted for and arranged in the first continuous portion of the periodic structure that should be formed by the second optical medium in the first optical medium, the fourth optical medium which has been substituted for and arranged in the second continuous portion of the periodic structure that should be formed by the second optical medium in the first optical medium, and the third continuous portion of the periodic structure which should be formed by the second optical medium and in which the periodicity of the second medium is irregular; and the first portion and the second portion are connected to the third portion. In the fourth optical element, since, under the first external field condition, the complex refractive index of the first optical medium, the complex refractive index of the second optical medium and the complex refractive index of the third optical medium are different from one another to light having a given wavelength, and the complex refractive index of the second optical medium and the complex refractive index of the fourth optical medium are substantially the same to the light having a given wavelength, the first portion and the third portion function as waveguides to the light having a given wavelength. On the other hand, since, under the second external field condition different from the first external field condition, the complex refractive index of the first optical medium, the complex refractive index of the second optical medium and the complex refractive index of the fourth optical medium are different from one another to the light having a given wavelength, and the complex refractive index of the second optical medium and the complex refractive index of the third optical medium are substantially the same to the light having a given wavelength, the second portion and the third portion function as waveguides to the light having a given wavelength. Thus, the fourth optical element of the present invention is capable of switching the heading direction of the light having a given wavelength which has been inputted in the third portion either to the first portion or to the second portion.

To describe it more specifically, the above fourth optical element has a two-dimensional or three-dimensional structure which comprises at least two types of optical media having different complex refractive indices and in which spots formed of the same type of optical medium are arranged periodically. The irregularities in the periodic structure of this structure exist as one-dimensionally continuous spots in the structure, and the one-dimensionally continuous spots function as an optical waveguide. When at least four types of optical media are used, these optical media are each defined as the first optical medium, the second optical medium, the third optical medium and the fourth optical medium, and the complex refractive indices of the first to the fourth optical media in the vicinity of the frequency of light to be inputted in this optical waveguide are each defined as the first complex refractive index, the second complex refractive index, the third complex refractive index and the fourth complex refractive index, this structure has a two-dimensional or three-dimensional periodic structure formed of the second optical medium in the first optical medium, a portion of the two-dimensional or three-dimensional periodic structure formed of the second optical medium is substituted by the one-dimensionally continuous portion formed of the third medium to form the first portion, another portion thereof is substituted by the one-dimensionally continuous portion formed of the fourth medium to form the second portion, one-dimensionally continuous irregularities in the periodic structure of the second medium are formed in still another portion thereof to form the third portion, and the first portion and the second portion are connected to the third portion. Since the first complex refractive index and the second complex refractive index are different, the second complex refractive index and the third complex refractive index are also different, and the second complex refractive index and the fourth complex refractive index are about the same in the vicinity of the frequency of light to be inputted in this optical element, the third portion and the first portion function as optical waveguides for the incident light. By the application of electric field, magnetic field or pressure or the irradiation of light to the structure, or by a change in the electric field, magnetic field or pressure applied to the structure, a change in the state of applied light or a change in the temperature of the structure, the second complex refractive index and the fourth complex refractive index become different and the second complex refractive index and the third complex refractive index become about the same while the first complex refractive index and the second complex refractive index remain different in the vicinity of the frequency v, whereby the first portion no longer functions as the irregularity in the periodic structure to the incident light and therefore no longer functions as an optical waveguide while the second portion starts to function as an optical waveguide instead. Thus, the above fourth optical element is capable of switching the heading direction of the light inputted in the third portion between the first portion and the second portion.

Meanwhile, the optical demultiplexer of the present invention has a structure comprising the first optical medium, the second optical medium arranged periodically in the first optical medium, the third optical medium which has been substituted for and arranged in the first continuous portion of the periodic structure that should be formed by the second optical medium in the first optical medium, the fourth optical medium which has been substituted for and arranged in the second continuous portion of the periodic structure that should be formed by the second optical medium in the first optical medium, and the third continuous portion of the periodic structure which should be formed by the second optical medium and in which the periodicity of the second medium is irregular; and the first portion and the second portion are connected to the third portion. In this optical demultiplexer, since the complex refractive index of the first optical medium, the complex refractive index of the second optical medium and the complex refractive index of the third optical medium are different from one another to light having the first wavelength, and the complex refractive index of the second optical medium and the complex refractive index of the fourth optical medium are substantially the same to the light having the first wavelength, the first portion and the third portion function as waveguides to the light having the first wavelength. On the other hand, since the complex refractive index of the first optical medium, the complex refractive index of the second optical medium and the complex refractive index of the fourth optical medium are substantially different from one another to light having the second wavelength different from the first wavelength, and the complex refractive index of the second optical medium and the complex refractive index of the third optical medium are substantially the same to the light having the second wavelength, the second portion and the third portion function as waveguides to the light having the second wavelength. Thus, this optical demultiplexer is capable of directing the light having the first wavelength or the second wavelength which has been inputted in the third portion either to the first portion or to the second portion depending on wavelength thereof.

To describe it more specifically, the optical demultiplexer of the present invention has a two-dimensional or three-dimensional structure which comprises at least two types of optical media having different complex refractive indices and in which spots formed of the same type of optical medium are arranged periodically. The irregularities in the periodic structure of this structure exist as one-dimensionally continuous spots in the structure, and the one-dimensionally continuous spots function as a waveguide. When at least four types of optical media are used in this structure and each defined as the first optical medium, the second optical medium, the third optical medium and the fourth optical medium, the frequencies of two lights to be inputted in this optical waveguide are each defined as the first frequency and the second frequency, the complex refractive indices of the first to the fourth optical media in the vicinity of the first frequency are defined as the first complex refractive index, the second complex refractive index, the third complex refractive index and the fourth complex refractive index, and the complex refractive indices of the first to the fourth optical media in the vicinity of the second frequency are defined as the fifth complex refractive index, the sixth complex refractive index, the seventh complex refractive index and the eighth complex refractive index, this structure has a two-dimensional or three-dimensional periodic structure formed of the second optical medium in the first optical medium, a portion of the two-dimensional or three-dimensional periodic structure formed of the second optical medium is substituted by the one-dimensionally continuous portion formed of the third medium to form the first portion, another portion thereof is substituted by the one-dimensionally continuous portion formed of the fourth medium to form the second portion, one-dimensionally continuous irregularities in the periodic structure of the second medium are formed in still another portion thereof to form the third portion, and the first portion and the second portion are connected to the third portion. In this case, since the first complex refractive index and the second complex refractive index are different, the second complex refractive index and the third complex refractive index are also different, and the second complex refractive index and the fourth complex refractive index are about the same in the vicinity of the first frequency of light to be inputted in this optical element, the third portion and the first portion function as optical waveguides for the incident light, whereas since the fifth complex refractive index and the sixth complex refractive index are different, the sixth complex refractive index and the eighth complex refractive index are also different, and the sixth complex refractive index and the seventh complex refractive index are about the same in the vicinity of the second frequency, the third portion and the second portion function as optical waveguides for the incident light. Thus, the light having the first wavelength or the second wavelength which ha been inputted in the third portion heads either to the first portion or to the second portion depending on wavelength thereof, enabling the waveguide itself to function as an optical demultiplexer.

In the present invention, it has been paid attention that the response of the photonic crystal to incident light is determined by the spacial distribution of refractive index in the frequency (wavelength) of controlled light, i.e., incident light (or a certain range of frequencies when the incident light is not monochromatic light) in functioning as an optical element and is not influenced by the distribution of refractive index in other wavelength range.

Particularly, the active optical element according to the present invention uses a plurality of optical media whose refractive indices change by an external field. When the photonic crystal is formed by using such optical media, the refractive indices of two optical media out of the plurality of optical media are caused to be the same or about the same under a certain external field condition. As a result, the periodic distribution of refractive index that light senses is the distribution pattern of optical media other than the two optical media having the same refractive index.

Further, the refractive indices of two other optical media are caused to be the same under other external field condition. In this case as well, light in the optical element senses the distribution pattern of optical media other than the optical media having the same refractive index under the external field condition.

By reflecting the distribution patterns that light senses under these external field conditions on a desired crystal structure, shape of a lattice point and period, two significantly different photonic-band structures can be switched from one to the other by switching between the external field conditions.

The switchable waveguide in the photonic crystal according to the present invention, by the same principle as described above, operates by switching between the portions where the periodicity of refractive index is irregular in the crystal structure.

Further, the optical demultiplexer according to the present invention relies not on the switching of external field conditions, but on the frequency (wavelength) of incident light to cause changes in the refractive indices of optical media. In other words, the photonic crystal and the waveguide are constituted by a combination of optical media that can form a photonic crystal in which the portions that light senses as the irregularities in the periodicity of refractive index vary according to the frequency of the light, and caused to function as the optical demultiplexer.

According to the production process and the production device of the present invention, since the photonic crystal can be produced by repeating the step of forming every spot where the refractive index changes that corresponds to the same site in each unit cell at a time for the number of sites in a unit cell by shifting the optical medium as much as a minute distance by taking advantage of the translational symmetry of the crystal, they are easy to operate, and a three-dimensional photonic crystal with multiple periods in the wavelength range of light that has been virtually almost impossible to produce with the prior art can be produced in the form of a desired crystal structure with high accuracy by the production process and the production device of the present invention.

Further, according to the production process and the production device of the present invention, by changing an external field, with regard to the refractive index of the photonic crystal or the optical waveguide formed therein, a combination of optical media having the largest refractive index difference change in the frequency of controlled light to be inputted, or new spots having different refractive indices from the existing spots appear periodically, that is, a new periodic structure is formed after the change, or the ratio of the periodic peaks of the refractive indices of the media which occur in the periodic structure changes, where the response of the photonic crystal or the waveguide can be actively switched. Further, by forming spots that become a portion of the periodic structure of refractive index depending on the wavelength of the controlled light at other locations, there can be produced an optical demultiplexer in which light heads to different waveguides at a branch according to the wavelength thereof.

BRIEF DESCRIPTION OF THE DRAWINGS

The present invention will be understood more fully from the detailed description given herebelow and from the accompanying drawings of the preferred embodiments of the invention. However, the drawings are not intended to imply limitation of the invention to a specific embodiment, but are for explanation and understanding only.

In the drawings:

FIG. 12 shows the switching from a cesium chloride-type structure to a body-centered cubic structure by switching external field conditions.

FIG. 15 shows the states of switching the transmitting directions of light in an optical waveguide according to external field conditions.

FIG. 16 is a conceptual illustration showing the distribution of refractive index in an optical demultiplexer according to the optical waveguide in the photonic crystal.

DETAILED DESCRIPTION OF THE PREFERRED EMBODIMENTS

Figure 1:
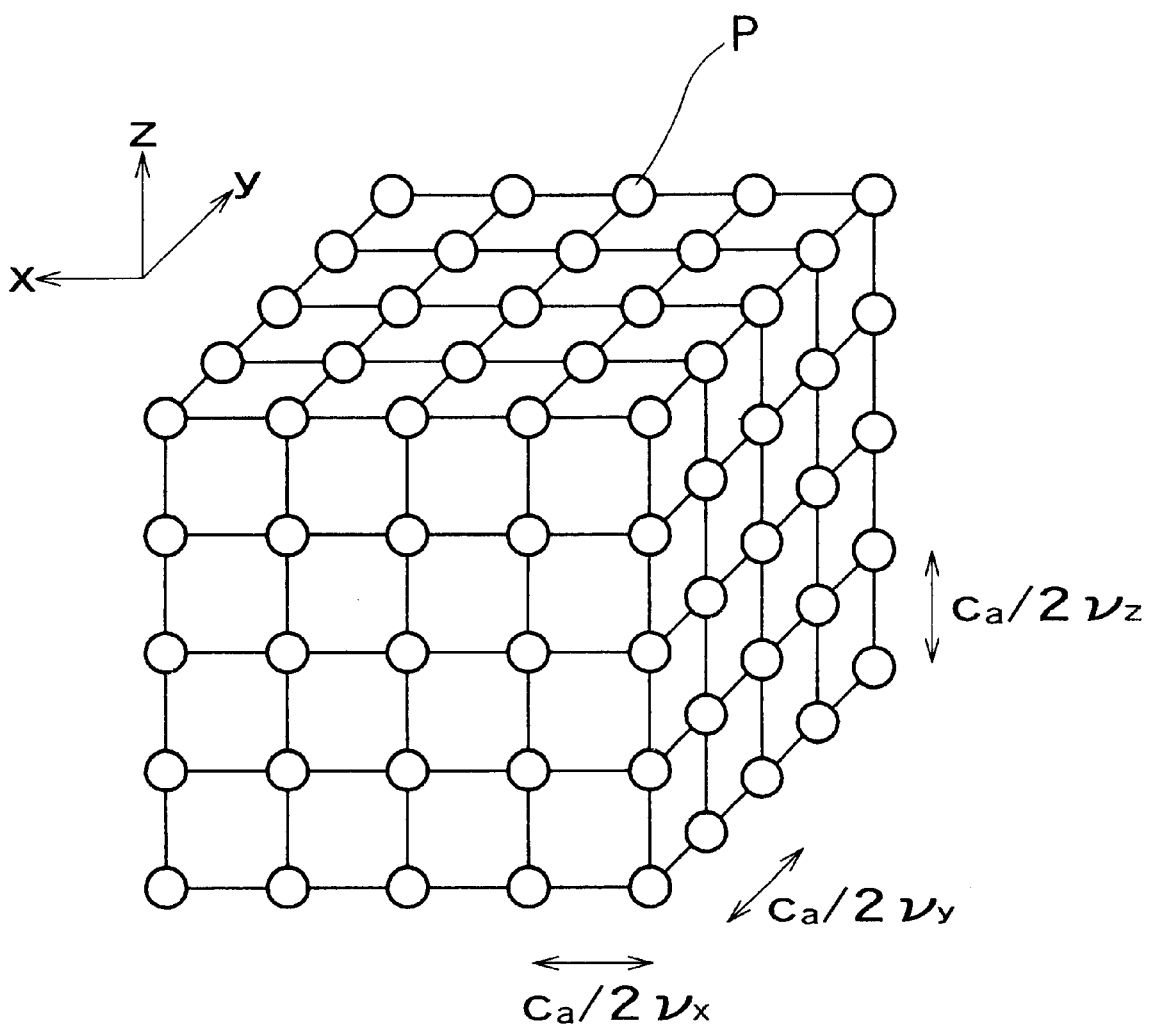
FIG. 1 is a perspective view showing a spot having high light intensity which has been formed on a lattice point constituting a three-dimensional rectangular-system structure in accordance with the process of the present invention.

The embodiments of the present invention will be described with reference to the drawings hereinafter.

First, the process of the present invention for producing an optical element will be described.

In the present invention, there is used an optical medium whose refractive index changes according to the intensity of applied light by irradiation of light only, by setting the optical medium aside for a given time after the irradiation of light, or by subjecting it to heat treatment, irradiation of electromagnetic wave (such as light) or corpuscular radiation (such as electron beam, a-beam or neutron beam), or treatment with chemicals after the irradiation of light. It is preferable that the change in the refractive index of the optical medium be induced by the above predetermined treatments after irradiation of light rather than by the irradiation of light only.

The optical medium showing such a change in refractive index can also be expressed as follows. That is, when the ratio between the maximum refractive index value and the minimum refractive index value in the optical medium before irradiation of light is defined as r(1), the ratio between the maximum refractive index value and the minimum refractive index value in the optical medium after the irradiation of light is defined as r(2), and the ratio between the maximum refractive index value and the minimum refractive index value in the optical medium after the completion of the treatment for causing a change in refractive index is defined as r(3), the optical medium that can be suitably used in the present invention preferably satisfies such conditions that $|r(3)-r(2)|$ is larger than $|r(2)-r(1)|$ and that the time needed for the ratio between the maximum refractive index value and the minimum refractive index value after the irradiation of light to exceed the value of $|r(3)-r(2)|/2$ is longer than the time required for the irradiation of light.

As a mechanism to cause a change in the refractive index of the material used in the above optical medium, there can be used a mechanism to cause a change in the refractive index by the chemical change undergoing the photopolymerization process of a polymerizable monomer or the polymerization process thereof comprising a combination of a photochemical reaction and temperature elevation, a mechanism to cause a change in the refractive index by population migration caused by irradiating a hole burning substance with light, or a mechanism to cause a change in the refractive index by irradiating a photoisomerizable compound with light. In addition, there can also be used a mechanism to cause a change in the refractive index by decomposing or modifying molecules in the light-irradiated portions of the optical medium by local temperature elevation or intense light.

More simply, a photopolymerizable monomer is impregnated into an inorganic porous material having high porosity to cause photopolymerization, only the monomer is then washed out and removed to form voids, and a change in the refractive index may be caused to appear by the residual polymer and the air present in the voids of the porous material. Alternatively, a material having a high refractive index is filled in the voids of the porous material from which the monomer has been removed, and a change in the refractive index may be caused to appear by the residual polymer and the filled material. In this case, there may not be a change in refractive index between the monomer before the irradiation of light and the polymer produced by the irradiation of light.

In the process of the present invention, an optical field where light intensity changes periodically in space is provided. Such an optical field can be created by using a stationary wave generated by interference between a laser beam heading in a certain direction and a laser beam heading in the opposite direction by reflecting the laser beam by a mirror, or by using an interference pattern in between progressive waves heading in at least two directions.

A description will be given to the case where an optical field in which light intensity is particularly high at positions corresponding to the lattice points of a three-dimensional cubic lattice is created by using the interference of a laser beam. When the above optical medium is placed in the field, a spot where a change in refractive index in the optical medium occurs can be "baked" as a latent image at the position with high light intensity which corresponds to the lattice point of a three-dimensional cubic lattice.

The process of the present invention has paid attention to the fact that the lattice points of a three-dimensional cubic lattice have translational symmetry and is characterized by repeating the above "baking" more than once by shifting the position of the optical medium as much as a minute distance which is about the same as the wavelength of light for each "baking".

That is, by the first "baking" step, each spot corresponding to a certain site in a unit cell constituting a desired crystal structure to be formed throughout the optical medium can be "baked" at a time. Then, the position of the optical medium is slightly shifted to match the position where light intensity is high in the optical medium to another site in the unit cell constituting the desired crystal structure, and "baking" is conducted again. The step of shifting the optical medium and conducting "baking" is repeated until every spot corresponding to every site in the unit cell constituting the crystal structure is "baked". Thereafter, the desired photonic crystal structure is obtained by allowing changes in the refractive indices of the "baked" spots to complete by setting the optical medium aside for a given time, or by causing the changes in the refractive indices of the "baked" spots to appear by predetermined treatments such as irradiation of light. The term "site" as used herein indicates the position corresponding to the position of each atom in the unit cell.

As described above, in the process of the present invention, by making the most of the translational symmetry of the crystal, the step of forming every spot where the refractive index changes that corresponds to the atom at the same site in each unit cell at a time is repeated for "the number of sites in a unit cell". Therefore, it is not necessary to repeat the step for "the number of periods or atoms" that constitute the crystal, as in conventional processes. In addition, in the process of the present invention, it is easy to move one "baking" site to another "baking" site since it can be accomplished just by slightly shifting the three-dimensional optical medium.

In principle, the same photonic crystal can also be produced by driving the whole optical system for creating the optical field where light intensity changes periodically. However, the photonic crystal can be produced more easily and more accurately by the process of the present invention than by driving the whole optical system because, in the process of the present invention, the optical medium is shifted.

Next, a description will be given to the production device for the optical element of the present invention. The production device for the optical element of the present invention comprises an optical system that creates an optical field where light intensity changes in space at a period of the wavelength order of light, and a movable stage that keeps an optical medium whose refractive index changes according to the intensity of applied light in the optical field where light intensity changes periodically and that can shift the optical medium for a minute distance of the wavelength order of light in the optical field. The phrase "wavelength order of light" as used herein indicates a wavelength of about 100 nm to 10 $\mu$m in the range from ultraviolet light to infrared light.

The optical system that creates the optical field where light intensity changes at a period of the wavelength order of light in space will be explained by taking the case where the interference of a laser beam is employed as an example.

Imagining the coordinate axes (x, y, z) in space, laser beams having frequencies of $v_x$, $v_y$ and $v_z$ are irradiated toward the origin point along with the x, y and z axes, respectively. At the other side of each of the axes is placed, via the origin point, a mirror for reflecting the laser beam, perpendicularly to the axis. For each laser beam irradiated along with each axis, incoming beam and reflected beam thereof interfere with each other to form a standing wave having a period of $C_a/(2v_x)$, $C_a/(2v_y)$ or $C_a/(2v_z)$ in space. $C_a$ is the light velocity in a medium (such as air). Light intensity is high at loops of these standing waves, and the point where the loops of the three one-dimensional standing waves having periodicity in the respective direction are overlapped with one another is said to be a point having particularly high light intensity.

Thus, as shown in FIG. 1, a point P having high light intensity can be formed on a lattice point of a three-dimensional rectangular system (cubic system if $v_x=v_y=v_z$, and tetragonal system if any two of $v_x$, $v_y$ and $v_z$ are equivalent). The values of $v_x$, $v_y$ and $v_z$ are selected according to the size of a unit cell of a photonic crystal to be formed. The incoming directions of the three laser beams and the orientations of the mirrors for reflecting the beams are determined according to the crystal structure of a photonic crystal to be formed, and they are not necessarily perpendicular to each other.

"Baking" is conducted on an optical medium in such an optical field. In this "baking", it is desirable that "baking" occur only on the spots where light intensity is high and do not occur on other spots. Therefore, the optical medium is desirably one on which "baking" occurs by the chemical change or the formation of a polymer precursor by multi-photon absorption such as two-photon absorption, or one on which "baking" occurs by the light intensity of a certain threshold.

By this "baking", the spacial modulation of refractive index is defined. As described above, it is desirable that there be a time lag between the exposure for "baking" and the actual occurrence of a change in refractive index. Further, as described above, it is desirable that a change in refractive index do not appear until the predetermined treatment such as heating or irradiation of light is carried out after the formation of a latent image by "baking". This is because when a change in refractive index occurs immediately on a lattice point where light intensity is high and reaches to such a degree that cannot be neglected, there is caused such a complicated effect that the light intensity distribution in an optical medium is affected and the modulated light intensity distribution promotes the change in refractive index, thereby making it difficult to produce a desired refractive index distribution. On the other hand, when the information about the subsequently occurring spacial modulation of refractive index is simply written on an optical medium by "baking" and the actual spacial modulation of refractive index is set to occur after the "baking", there won't be such a case where preceding "baking" affects succeeding "baking". Further, it is desirable that the "baking" process itself occur not only by the effect of an optical field where light intensity periodically changes, but in combination with other factors such as gate beam. This is because if "baking" does not occur when a laser beam that incurs interference is irradiated on an optical medium, the position of the optical medium can be adjusted while the laser beam that generates an interference pattern is actually irradiated on the optical medium. It is desirable that "baking" be conducted by, for example, the irradiation of a gate beam after the position of the optical medium is set.

The device of the present invention is equipped with a movable stage that keeps an optical medium in an optical field where light intensity periodically changes and can shift the optical medium for a minute distance of the wavelength order of light in the field. By using this movable stage, the optical medium is shifted for a minute distance in the spacially fixed field of periodic light intensity to conduct "baking" on each site in a unit cell. The minute distance ranges from about the wavelength of light to about one/tenth thereof (to 100 nm). The optical medium can be shifted with great accuracy by the piezo element-driven stage. Depending on the manner in which the optical medium is shifted by the movable stage, the crystal structure of a photonic crystal to be formed is determined. Further, when a photonic crystal having a crystal structure whose lattice points have irregular shapes is to be formed, the formation of the crystal structure can be controlled by varying the intensity of applied light and the time of irradiation, or by conducting "baking" on a particular site twice or three times by shifting the optical medium slightly.

When the production device for the optical element of the present invention further comprises a light source and a detector for evaluating an optical element formed so as to check the formation of a photonic-bandgap, it becomes possible to produce the optical element while the performance of the photonic crystal is checked.

A description will be given to the manner in which an optical element is moved to form the typical crystal structures hereinafter.

To form a body centered cubic lattice, a laser beam is irradiated toward the origin point along with each of the x, y and z axes that are orthogonal to one another with the relationship among the frequencies of the three laser beams being $v_x=v_y=v_z$, and standing waves are formed by the interference between the three laser beams and reflected beams thereof from mirrors placed, via the origin point, at the other sides of the axes. First, an optical medium is placed at the origin point (0, 0, 0) to conduct the first "baking". Next, the optical medium is shifted for a vector of (a/2, a/2, a/2) from the origin point to conduct the second "baking", with $a=c_v/(nv_1)$ ($C_v$ is a light velocity in a vacuum, and n is the refractive index of the optical element).

To form a face-centered cubic lattice, a laser beam is irradiated toward the origin point along with each of the x, y and z axes that are orthogonal to one another with the relationship among the frequencies of the three laser beams being $v_1=v_2=v_3$, and standing waves are formed by the interference between the three laser beams and reflected beams thereof from mirrors placed, via the origin point, at the other sides of the axes. First, an optical medium is placed at the origin point (0, 0, 0) to conduct the first "baking". Next, the optical medium is shifted for a vector of (a/2, 0, a/2) from the origin point to conduct the second "baking". The optical medium is then shifted for a vector of (0, a/2, a/2) from the origin point to conduct the third "baking". The optical medium is then shifted for a vector of (a/2, a/2, 0) from the origin point to conduct the forth "baking". All the above baking steps except for the first step are conducted with $a=c_v/(nv_1)$.

To form a tetragonal-system body-centered lattice, a laser beam is irradiated toward the origin point along with each of the x, y and z axes that are orthogonal to one another with the relationship among the frequencies of the three laser beams being $v_1\neq v_2=v_3$, and standing waves are formed by the interference between the three laser beams and reflected beams thereof from mirrors placed, via the origin point, at the other sides of the axes. First, an optical medium is shifted for a vector of (a/2, b/2, b/2) from the origin point to conduct the second "baking", with $a=c_v/(nv_1)$ and $b=c_v/(nv_2)$.

To form a rectangular-system base-centered lattice, a laser beam is irradiated toward the origin point along with each of the x, y and z axes that are orthogonal to one another with the relationship among the frequencies of the three laser beams being $v_1\neq v_2$, $v_2\neq v_3$ and $v_1\neq v_3$, and standing waves are formed by the interference between the three laser beams and reflected beams thereof from mirrors placed, via the origin point, at the other sides of the axes. First, an optical medium is placed at the origin point (0, 0, 0) to conduct the first "baking". Next, the optical medium is shifted for a vector of (a/2, b/2, 0) from the origin point to conduct the second "baking", with $a=c_v/(nv_1)$ and $b=c_v/(nv_2)$.

To form a rectangular-system face-centered lattice, a laser beam is irradiated toward the origin point along with each of the x, y and z axes that are orthogonal to one another with the relationship among the frequencies of the three laser beams being $v_1\neq v_2$, $v_2\neq v_3$ and $v_1\neq v_3$, and standing waves are formed by the interference between the three laser beams and reflected beams thereof from mirrors placed, via the origin point, at the other sides of the axes. First, an optical medium is placed at the origin point (0, 0, 0) to conduct the first "baking". Next, the optical medium is shifted for a vector of (a/2, 0, c/2) from the origin point to conduct the second "baking". The optical medium is then shifted for a vector of (0, b/2, c/2) from the origin point to conduct the third "baking". The optical medium is then shifted for a vector of (a/2, b/2, c/2) from the origin point to conduct the forth "baking". All the above baking steps except for the first step are conducted with $a=c_v/(nv_1)$, $b=c_{v/(nv_2)}$ and $c=c_v/(nv_3)$.

To form a rectangular-system body-centered lattice, a laser beam is irradiated toward the origin point along with each of the x, y and z axes that are orthogonal to one another with the relationship among the frequencies of the three laser beams being $v_1\neq v_2$, $v_2\neq v_3$ and $v_1\neq v_3$, and standing waves are formed by the interference between the three laser beams and reflected beams thereof from mirrors placed, via the origin point, at the other sides of the axes. First, an optical medium is placed at the origin point (0, 0, 0) to conduct the first "baking". Next, the optical medium is shifted for a vector of (a/2, b/2, c/2) from the origin point to conduct the second "baking", with a $c_v/(nv_1)$, $b=c_v/(nv_2)$ and $c=c_v/(nv_3)$.

To form a hexagonal system, a beam having a frequency of $v_1$ is irradiated along with the vector $(3^{1/2}a/2, -a/2, 0)$, a beam having a frequency of $v_2$ is irradiated along with the y axis and a beam having a frequency of $v_3$ is irradiated along with the z axis, toward the origin point, with the relationship among the frequencies of the three laser beams being $v_1=v_2\neq v_3$, and standing waves are formed by the interference between these laser beams and beams thereof reflected vertically on mirrors placed, via the origin point, at the other sides of the vector and the axes. In this state, an optical medium is placed at the origin point (0, 0, 0) to conduct "baking" with $a=c_v/(nv_1)$.

To form a trigonal system, a laser beam is irradiated along with each of three vectors that are spread at the same angles from one another toward the origin point with the relationship among the frequencies of the three laser beams being $v_1=v_2=v_3$, and standing waves are formed by the interference between these laser beams and beams thereof reflected vertically on mirrors placed, via the origin point, at the other sides of the vectors. In this state, an optical medium is placed at the origin point (0, 0, 0) to conduct "baking".

To form a monoclinic-system base-centered lattice, a beam having a frequency of $v_2$ is irradiated along with the y axis, a beam having a frequency of $v_3$ is irradiated along with the z axis and a beam having a frequency of $v_1$ is irradiated along with the vector $(\alpha, 0, \beta)$ ($\alpha\neq 0$, $\beta 0$), toward the origin point, with the relationship among the frequencies of the three laser beams being $v_1\neq v_2$, $v_2\neq v_3$ and $v_1\neq v_3$, and standing waves are formed by the interference between these laser beams and beams thereof reflected vertically on mirrors placed, via the origin point, at the other sides of the axes and the vector. First, an optical medium is placed at the origin point (0, 0, 0) to conduct the first "baking". Next, the optical medium is shifted for a vector of (a/2, b/2, 0) from the origin point to conduct the second "baking", with $a=(\alpha_2+\beta_2)^{1/2}c_v/(\beta nv_1)$ and $b=c_v/(nv_2)$.

To form a diamond structure, a laser beam is directed toward the origin point along with each of the x, y and z axes that are orthogonal to one another with the relationship among the frequencies of the three laser beams being $v_1=v_2=v_3$, and standing waves are formed by the interference between the three laser beams and reflected beams thereof from mirrors placed, via the origin point, at the other sides of the axes. First, an optical medium is placed at the origin point (0, 0, 0) to conduct the first "baking". Next, the optical medium is shifted for a vector of (a/2, 0, a/2) from the origin point to conduct the second "baking". The optical medium is then shifted for a vector of (0, a/2, a/2) from the origin point to conduct the third "baking". The optical medium is then shifted for a vector of (a/2, a/2, 0) from the origin point to conduct the forth "baking". The optical medium is then shifted for a vector of (a/4, 3a/4, a/4) from the origin point to conduct the fifth "baking". The optical medium is then shifted for a vector of (3a/4, a/4, a/4) from the origin point to conduct the sixth "baking". The optical medium is then shifted for avector of (3a/4, 3a/4, 3a/4) from the origin point to conduct the seventh "baking". The optical medium is then shifted for a vector of (a/4, a/4, 3a/4) from the origin point to conduct the eighth "baking". All the above baking steps except for the first step are conducted with $a=c_v/(nv_1)$.

When the above step of shifting an optical medium and conducting "baking" is repeated to obtain the above crystal structures, a beam can be equally directed onto all sites. Meanwhile, crystal structures different from the above crystal structures can also be obtained by changing the manner in which the refractive index changes by altering the intensity of the beam or the amount of the irradiated beam. For example, by setting different conditions for the first to the forth beam irradiation and for the fifth to the eighth beam irradiation in forming the diamond structure, the sizes of the sites produced by a series of bakings and undergone changes in refractive indices and the degree of the changes in refractive indices are different depending on the above two different conditions, whereby a zincblende structure can be formed.

Although a description has been so far given to the case where a photonic crystal having a three-dimensional periodic structure is formed, the present invention can also be applied similarly to the case where a photonic crystal having a two-dimensional or one-dimensional periodic structure is formed, as a matter of course.

Examples of the production process and production device for the optical element of the present invention will be described with reference to the drawings hereinafter.

EXAMPLE 1

A description will be given to the example where a photonic crystal having a body-centered cubic structure was formed by using the device shown in FIG. 2. The photonic crystal formed in the present example comprises cured epoxy resins, which are arranged so as to be the lattice points of a body-centered cubic structure, in porous silica used as a skeleton and has a refractive index periodic structure formed by the cured epoxy resins and the air present in the voids of the porous silica.

The porous silica used as the skeleton of the photonic crystal was formed by a sol-gel process. This porous silica has a size of 1 mm×1 mm×1 mm, a porosity of not less than 90%, an average void diameter of 30 nm and a refractive index of 1.015 to 1.055 which is close that of air. Further, a resin solution was formed by adding 1% of 4-morpholino-2,5-dibutyroxybenzenediazoniumfluoroborate as a photoacid generator to Ceroxide 2021 (product of Diecel Chemical Co., Ltd.) as an epoxy resin. The porous silica was immersed in the resin solution to impregnate the porous silica with the resin solution. From the viewpoint of the wavelength of light, such porous silica having minute voids at high density and a very high porosity of not less than 90% is equivalent to a body consisting of the resin solution only.

Figure 2:
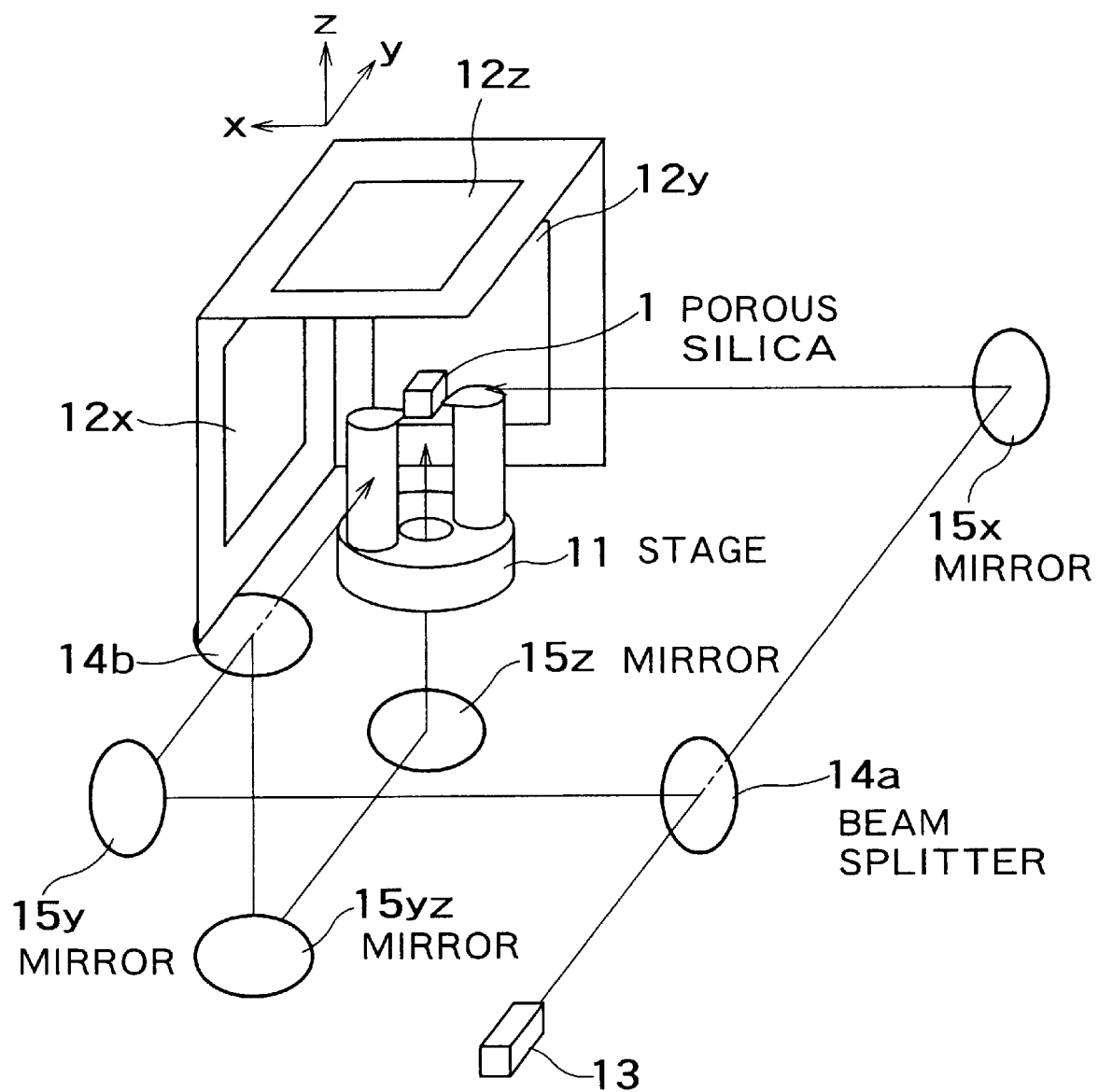
FIG. 2 is a perspective view showing the device used in example 1 of the present invention for producing an optical element.

FIG. 2 shows porous silica 1 placed on the sample holder 11a of a piezo element-driven stage 11. This stage is movable in the directions of x, y and z for a distance as small as the wavelength of light. Three adjacent mirrors 12x, 12y and 12z are placed in such a manner that each of the mirrors is opposed to one of three adjacent surfaces of the porous silica 1.

The irradiation of the porous silica 1 with a beam is carried out in the following manner. A laser beam having a wavelength of 810 nm is generated by using an argon laser-excited titanium sapphire laser as a light source 13. The laser beam passes through a beam splitter 14a and is reflected by a mirror 15x to head in the direction of x. Then, the incident beam heading in the direction of x to the porous silica 1 and reflected beam thereof from a mirror 12x interfere with each other to form a standing wave at the location of the porous silica 1. The laser beam reflected by the beam splitter 14a is reflected by a mirror 15y and passes through a beam splitter 14b to head in the direction of y. Then, the incident beam heading in the direction of y to the porous silica 1 and reflected beam thereof from a mirror 12y interfere with each other to form a standing wave at the location of the porous silica 1. The laser beam reflected by the beam splitter 14b is reflected by a mirror 15yz and a mirror 15z to head in the direction of z. Then, the incident beam heading in the direction of z to the porous silica 1 and reflected beam thereof from a mirror 12z interfere with each other to form a standing wave at the location of the porous silica 1.

First, the porous silica 1 was placed at the origin point in the space created by the above standing waves, and the first beam irradiation was conducted as described above. Then, the porous silica 1 was shifted in the direction of the vector (135 nm, 135 nm, 135 nm), that is, shifted 135 nm from the origin point in each of the x, y and z directions, and the second beam irradiation was conducted on the porous silica 1 at the location under the same irradiation condition as used for the first irradiation.

This porous silica 1 was heated for 5 hours while maintained at 60° C. to cure the epoxy resin spots where three-dimensional "baking" was conducted. Thus, the cured epoxy resin spots were held at the lattice points of a body-centered cubic lattice having a lattice constant of 270 nm in the porous silica 1. Thereafter, the porous silica was washed with acetone and methanol to wash out the uncured resin and the acid generator.

Figure 3:
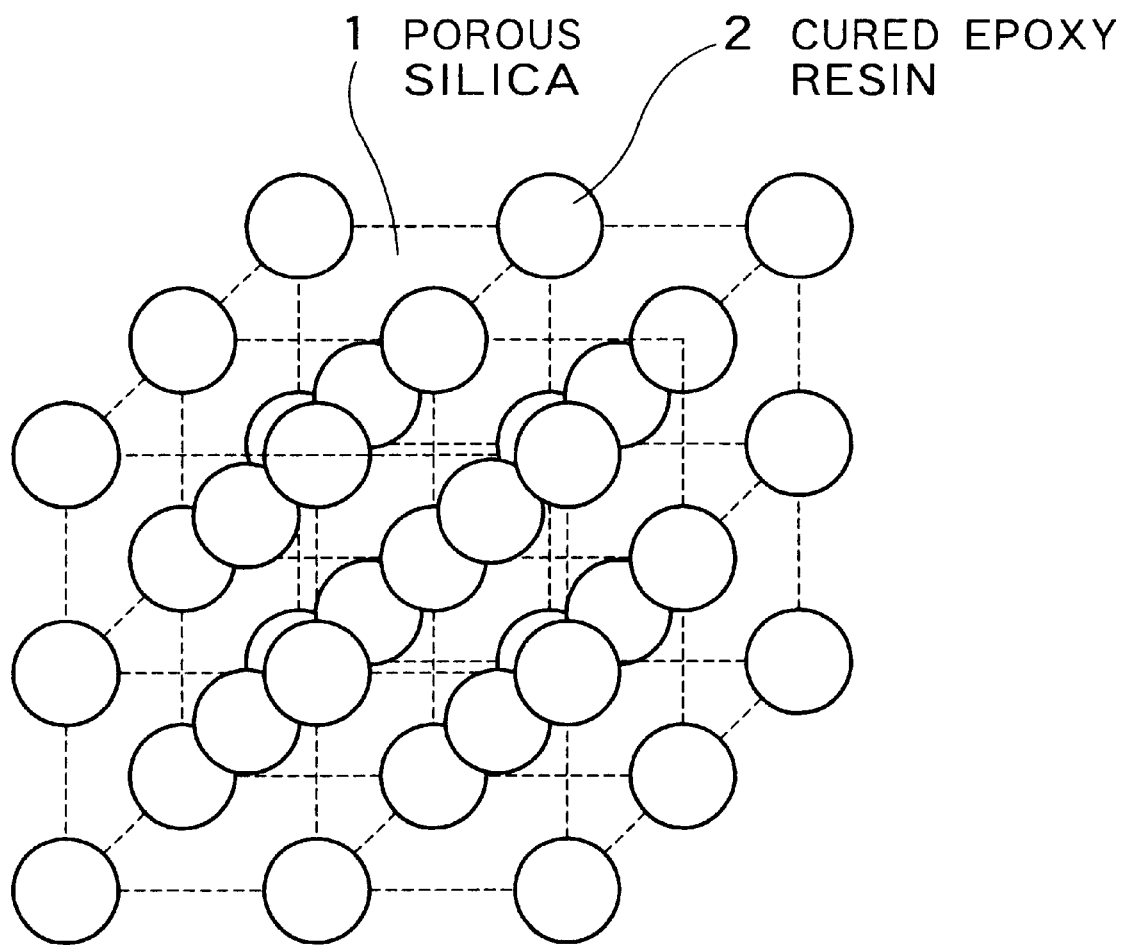
FIG. 3 is a perspective view showing the structure of the photonic crystal produced in example 1 of the present invention.

Thus, as shown in FIG. 3, there was formed a photonic crystal in which cured epoxy resins 2 were arranged in the form of a body-centered cubic structure in the porous silica 1.

Figure 4:
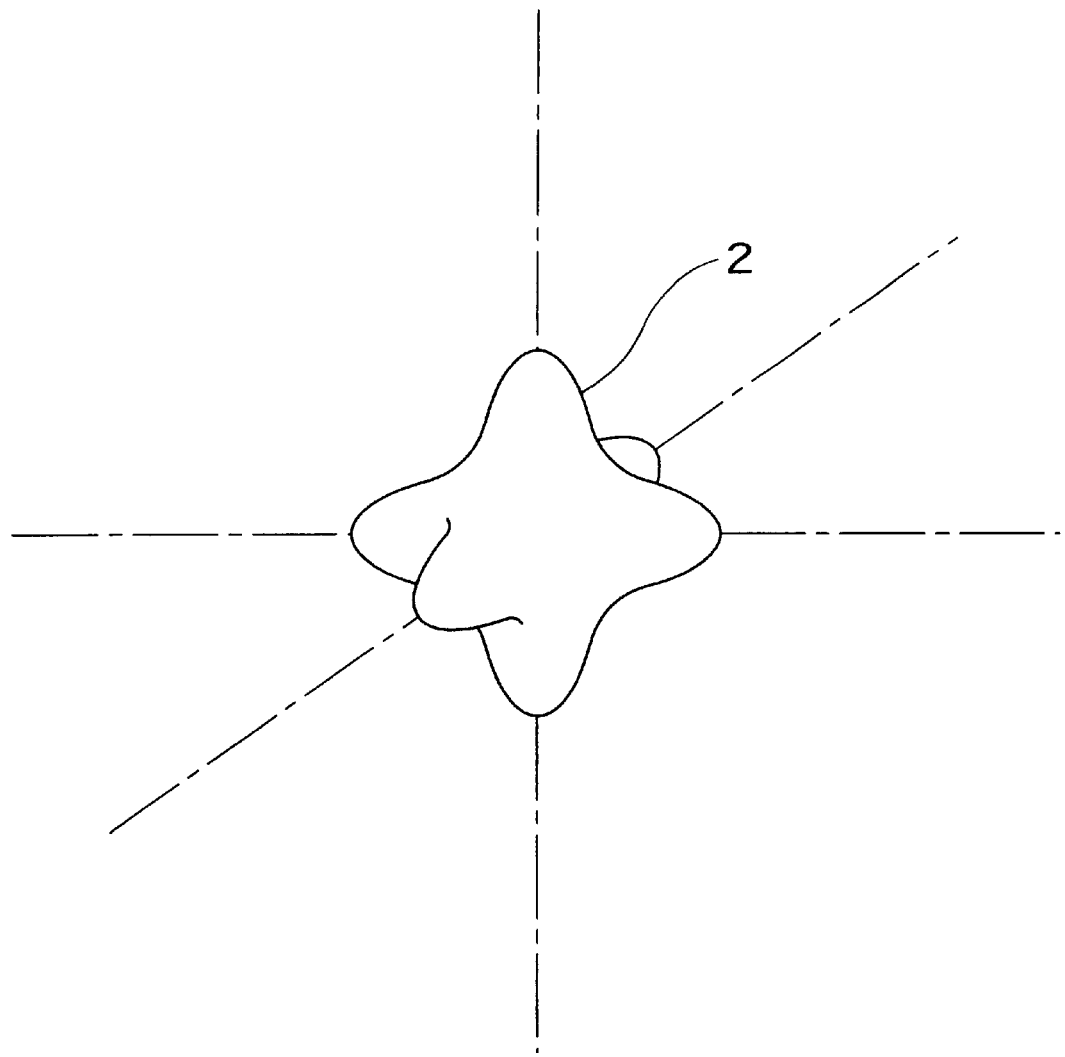
FIG. 4 is a conceptual illustration exemplifying the case where the distribution of refractive index has a form having bulges in the directions of three different axes.

Further, when the shape of this cured epoxy resin 2 was examined, it had a shape having bulges in the directions of the three different axes, as exemplified in FIG. 4. This shape directly corresponds to the distribution of refractive index. In other words, the distribution of refractive index is not isotropic but has a shape with low symmetry. As a result, even in the case of a crystal structure in which an optical bandgap does not appear even when the distribution of refractive index is isotropic as in a global shape, a bandgap appears in the crystal structure if it has such distribution of refractive index as shown in FIG. 4. In addition, as compared with the case where the distribution of refractive index is isotropic, when the distribution of refractive index is anisotropic as shown in FIG. 4, there can be obtained the effect that the optical bad gap further increases in size.

EXAMPLE 2

A description will be given to the example where a photonic crystal having a diamond structure was formed by using the device shown in FIG. 2. The photonic crystal formed in the present example comprises acryl resins arranged so as to be the lattice points of a diamond structure in porous silica.

Figure 5:
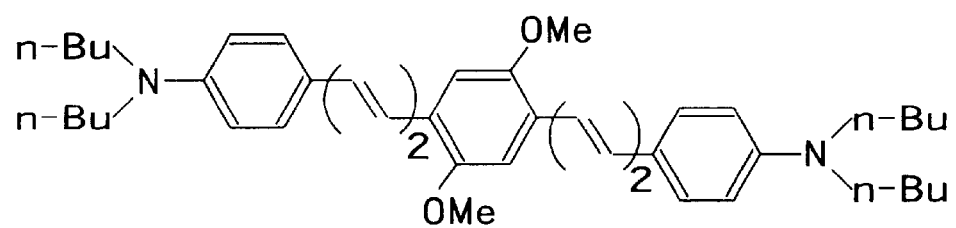
FIG. 5 shows the chemical formula of the photopolymerization initiator used in example 2.

Porous silica having the same standard and size as that used in example 1 was used. Further, there was prepared a photopolymerizable photosensitive resin solution comprising a multifunctional acrylate monomer having superfine gold particles dispersed therein (SartomerSR9008) as a main component, a polymeric binder containing about 10% of a styrene-acrylonitrile (75:25) copolymer, and about 0.1% of a photopolymerization initiator (having a chemical structure shown in FIG. 5). The porous silica was immersed in this resin solution to impregnate the porous silica with the resin solution.

In the device similar to that shown in FIG. 2, the porous silica 1 was placed at the origin point on the sample holder 11a of the stage 11. By using a beam having a wavelength of 1,548 nm from a parametric oscillator pumped by a laser beam having a wavelength of 775 nm which had been generated by an argon ion laser-excited titanium sapphire laser as the light source 13, a standing wave was formed in each of the x, y and z directions to create a spot with high light intensity comprising a three-dimensional cubic lattice in the porous silica. Two photon absorption was conducted with a photoacid initiator at the lattice points of the three-dimensional cubic lattice to polymerize monomers at the positions. Next, the porous silica was shifted for a vector of (258 nm, 0 nm, 258 nm) from the origin point and, again, monomers were polymerized at the lattice points of the three-dimensional cubic lattice by the irradiation of a laser beam. Then, the polymerization step comprising shifting the porous silica and irradiating the shifted porous silica with a laser beam was conducted successively by shifting the porous silica for vectors of (0, 258 nm, 258 nm), (258 nm, 258 nm, 0), (129 nm, 388 nm, 129 nm), (388 nm, 129 nm, 129 nm), (388 nm, 388 nm, 388 nm) and (129 nm, 129 nm, 388 nm) from the origin point, whereby acrylate polymers were arranged and maintained in the form of a diamond structure in the porous silica. Thereafter, the porous silica was washed with acetone to remove the monomer. Thus, a photonic crystal having a diamond structure was obtained.

In the present example, the refractive index hardly changes at the time of producing a polymer by polymerizing a monomer by photopolymerization (The refractive indices of the monomer and the polymer are about 1.41 and 1.49, respectively). That is, the polymerization step corresponds to "baking". Thereafter, the spacial modulation of refractive index appears by the step of removing the monomer, and a photonic crystal is obtained.

To minimize the influence of the preceding "baking(s)" on a change in refractive index when "baking" is conducted by shifting the position of the porous silica, it is preferable to conduct the polymerization not only by two-photon absorption using the beam intensified at the lattice point by interference, but in combination with the subsequent irradiation of a beam having the second wavelength, use of a monomer which starts to be polymerized by an increase in temperature, or use of a mixture of the monomer and a sensitizer, a sensitizer precursor, a radical generator or the like.

EXAMPLE 3

A description will be given to the example where a photonic crystal having a face-centered cubic structure or a crystal structure similar to that was formed by using the device shown in FIG. 2.

Porous silica impregnated with the same photosensitive resin solution as used in example 2 was prepared. As in the case of example 2, the porous silica 1 was placed at the origin point on the sample holder 11a of the stage 11. By using a beam having a wavelength of 1,548 nm from a parametric oscillator pumped by a laser beam having a wavelength of 775 nm which had been generated by an argon ion laser-excited titanium sapphire laser as the light source 13, a standing wave was formed in each of the x, y and z directions to create a spot with high light intensity comprising a three-dimensional cubic lattice in the porous silica. Two-photon absorption was conducted with a photoacid initiator on the lattice points of the three-dimensional cubic lattice to polymerize monomers at the positions. Then, the porous silica was shifted for a vector of (258 nm, 0 nm, 258 nm) from the origin point and, again, monomers were polymerized at the lattice points of the three-dimensional cubic lattice by the irradiation of a laser beam. Then, the polymerization step comprising shifting the porous silica and irradiating the shifted porous silica with a beam was conducted successively by shifting the porous silica for vectors of (0, 258 nm, 258 nm) and (258 nm, 258 nm, 0) from the origin point, whereby acrylate polymers were arranged and maintained in the form of a face-centered cubic structure in the porous silica. Thereafter, the porous silica was washed with acetone to remove the monomer. Thus, a photonic crystal (example 3A) having a face-centered cubic structure was obtained.

Meanwhile, another porous silica impregnated with the same photosensitive resin solution as the above was prepared. Then, "baking" was conducted on the lattice points of the face-centered cubic structure in the same manner as described above, whereby acrylate polymers were arranged and maintained in the form of a face-centered cubic structure in the porous silica. Then, the following four steps were additionally conducted on this porous silica. That is, the polymerization step comprising shifting the porous silica and irradiating the shifted porous silica with a beam was conducted successively by shifting the porous silica for vectors of (22 nm, 22 nm, 0 nm), (280 nm, 22 nm, 250 nm), (22 nm, 280 nm, 258 nm), (280 nm, 280 nm, 0 nm) from the origin point, thereby causing acrylate polymers to be held in the porous silica. Incidentally, the laser beam irradiated in conducting these additional steps was made less intensive than that used in the formation of the face-centered cubic structure. Thereafter, the porous silica was washed with acetone to remove the monomer. Thus, a photonic crystal (example 3B) having a three-dimensional periodic structure of refractive index was obtained.

The photonic crystal of example 3B has a structure in which a "snowman-shaped" polymer spot comprising a small polymer sphere adjacent to a large polymer sphere is formed at the lattice point of the face-centered cubic structure.

In example 3B, the small polymer sphere produced by the above additional steps conducted in addition to the steps for forming the face-centered cubic structure was closely examined. As a result, it has been found that the shape of the polymer sphere formed by single irradiation of a laser beam and corresponding to the lattice point of a simple cubic lattice having a lattice constant of 270 nm is not exactly spherical, but the polymer spheres belonging to the same group are exactly the same in size and shape.

Thus, in the process of the present invention, the shapes of the spots (lattice points) with particularly high light intensity which have been generated in space by interference pattern are the same even if the shapes are not spherical. This is true even in the case where lattice points having irregular shapes are formed due to an unintended cause, and lattice points having exactly the same shape are formed.

Incidentally, the photonic crystal of example 3B has low symmetry than the photonic crystal of example 3A having a face-centered cubic lattice because it comprises large polymer spheres formed at the lattice points of the face-centered cubic lattice and small polymer spheres formed at the positions slightly sifted from those of the large polymer spheres. Therefore, in the photonic crystal of example 3B, a bandgap occurred in the direction in which no bandgap occurred in the photonic crystal of example 3A.

EXAMPLE 4

Figure 6:
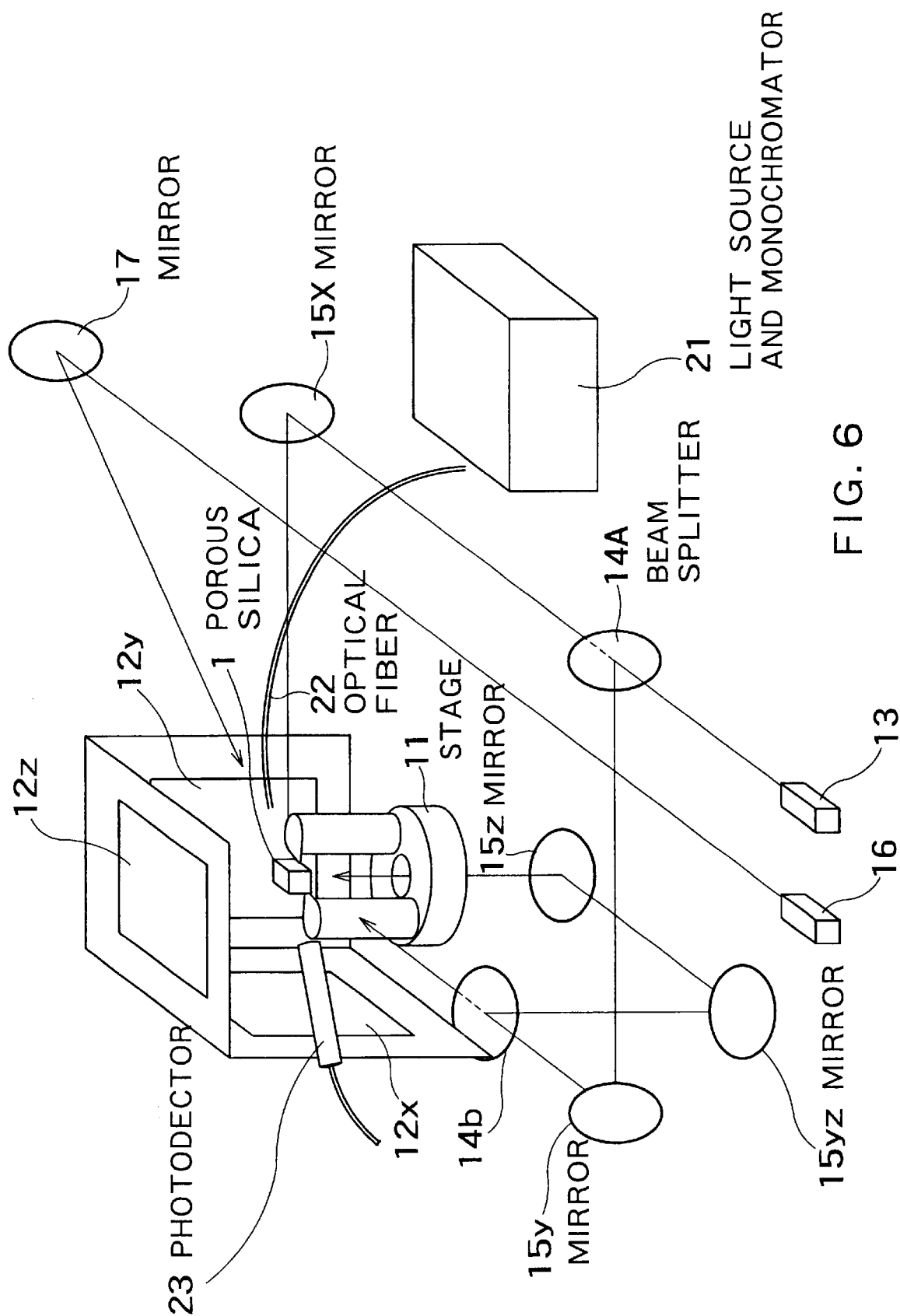
FIG. 6 is a perspective view showing the device used in example 4 of the present invention for producing an optical element.

FIG. 6 shows another optical element-producing device associated with the present invention. The device shown in FIG. 6 comprises the second light source 16 for irradiating a beam having the second wavelength, a light source and spectroscope 21 for measuring the transmission spectrum of the optical medium placed on the stage, and a photodetector 23, in addition to the device configuration shown in FIG. 2.

The optical medium to be processed by this device goes through a change in refractive index not only by the "baking" based on the interference pattern of light, but by the irradiation of a beam having the second wavelength from the second light source 16.

Using this device, after the baking corresponding to a desired crystal structure was conducted in the same manners as in examples 1 to 3, a beam having the second wavelength from the second light source 16 was caused to be reflected by a mirror 17 and irradiated to the optical medium impregnated in the porous silica 1 to cause a change in refractive index, thereby forming a photonic crystal. Thereafter, the optical medium was irradiated with a beam from the light source and spectroscope 21 for measuring the transmission spectrum via an optical fiber 22 having a condenser lens at the tip, the wavelength thereof was swept by the spectroscope included in the unit 21, and the transmitted beam was detected by the photodetector 23 and measured by the transmission spectrum of the photonic crystal, which is shown in FIG. 7.

Figure 7:
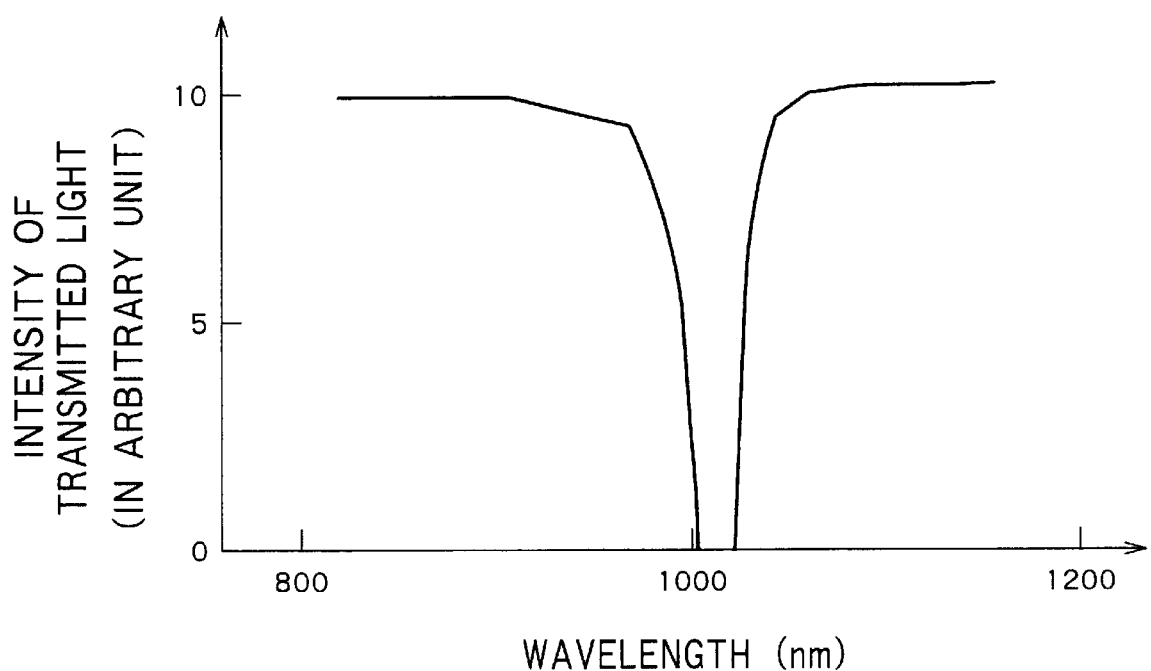
FIG. 7 shows the transmission spectrum of the photonic crystal produced in example 4 of the present invention.

As shown in FIG. 7, it was observed that a photonic-bandgap was formed in the produced photonic crystal in the vicinity of the wavelength of 1,000 nm. Thus, the device shown in FIG. 6 is capable of producing a photonic crystal while evaluating performance thereof.

Figure 8:
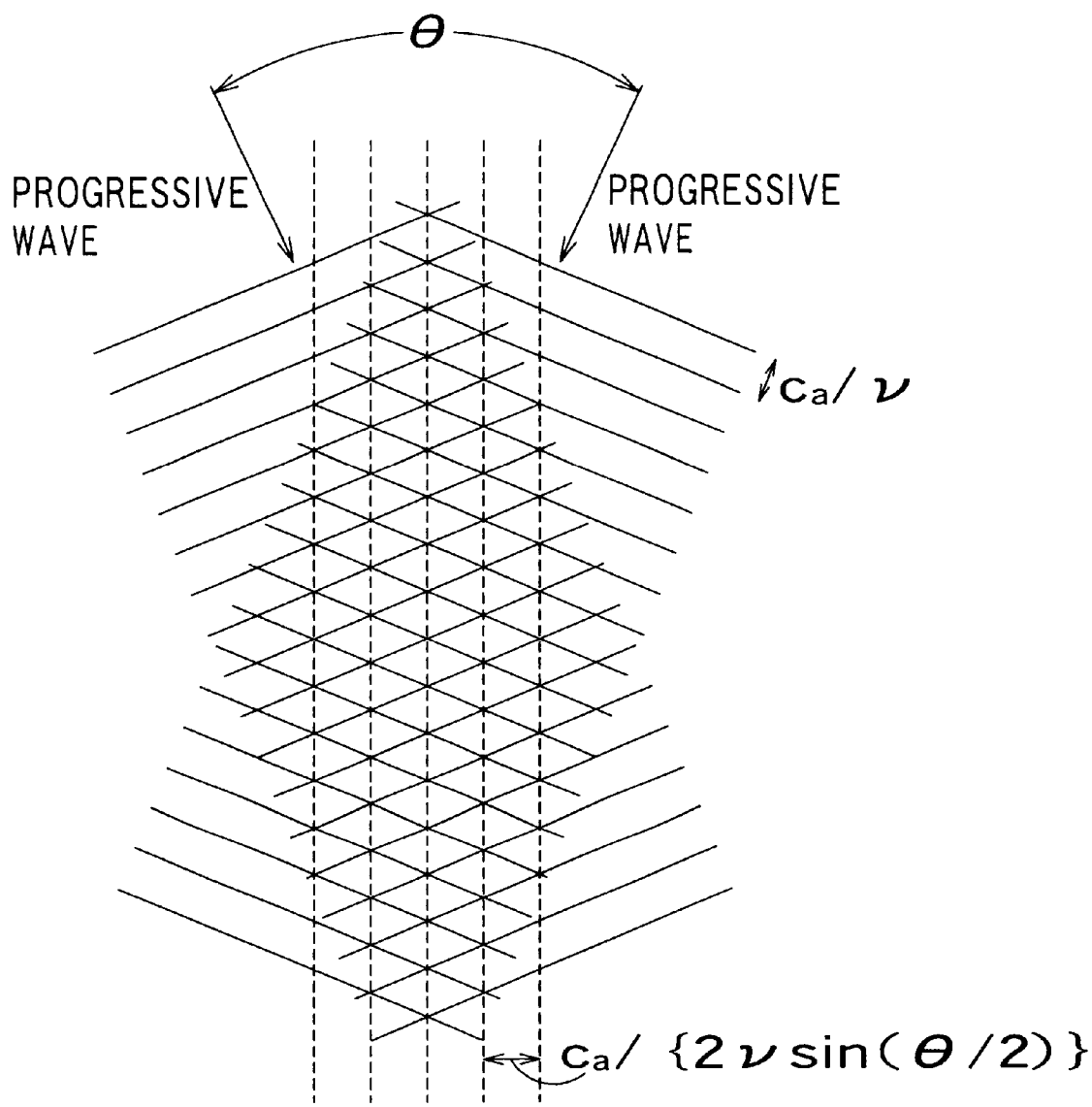
FIG. 8 shows a process for forming a one-dimensional periodic structure of light intensity by the interference of two progressive waves heading in different directions in accordance with the present invention.

The formation of a three-dimensional crystal structure using the devices shown in FIG. 2 or 6 has been described in the above examples. Alternatively, as shown in FIG. 8, the interference between progressive waves heading in different directions may be used to produce an optical field where light intensity periodically changes. As shown in FIG. 8, when two laser beams having a frequency of ν are caused to intersect at an angle of θ, the area with high light intensity (indicated by broken lines in FIG. 8) where the two beams intersect takes a one-dimensional periodic structure having a period of $C_O/\{2\nu \sin(\theta/2)\}$. When laser beams heading in three different directions are used, a two-dimensional hexagonal system can be obtained.

Up to this point, the production process and production device for the optical element of the present invention have been described with reference to examples 1 to 4.

Next, a description will be given to an optical element and an optical demultiplexer to which a photonic crystal that can be obtained not only by the above process and device but also by other processes and devices have been applied.

A photonic crystal is a medium whose refractive index shows a periodic change in space at the wavelength order of light, and exhibits unique optical properties. This is because light senses the periodicity of refractive index in such a structure and shows a band structure. As in the case of the bandgap in electronic energy in a semiconductor, there can be formed a photonic-bandgap, which is a frequency band that blocks the transmission of light, in a photonic-band structure. By the photonic-band structure and the photonic-bandgap, high degrees of wavelength dispersibility and anisotropy and a waveguide with a sharp bending angle that can be packed in confined space can be realized.

This band structure is determined by the spacial distribution of refractive index. Particularly, the band structure in the wavelength range (frequency band) of incident light, which determines the response of the photonic crystal to incident light, is determined by the refractive index distribution in the wavelength range of the incident light.

In the present invention, at least two types of optical media are used to form a photonic crystal. Each of the optical media is arranged periodically. The phrase "optical medium" used herein indicates a concept including air in the case of a dielectric three-dimensional periodic structure constructed in a vacuum or in the air, space such as vacuum space, gas, a liquid an the like. Further, in the following description, when the external field condition is A, the refractive index of the ith optical medium to light having a frequency of ν will be expressed as $n_i(\nu, A)$. The phrase "external field condition" means conditions of an electric field, magnetic field and pressure to be applied to the photonic crystal, conditions of the intensity, wavelength, direction of polarization and the like of light to be irradiated to the photonic crystal, or the temperature of the photonic crystal.

First, in the external field condition $A_1$, the case where the refractive indices of N types of optical media constituting the photonic crystal are different from one another is considered.

Figure 9:
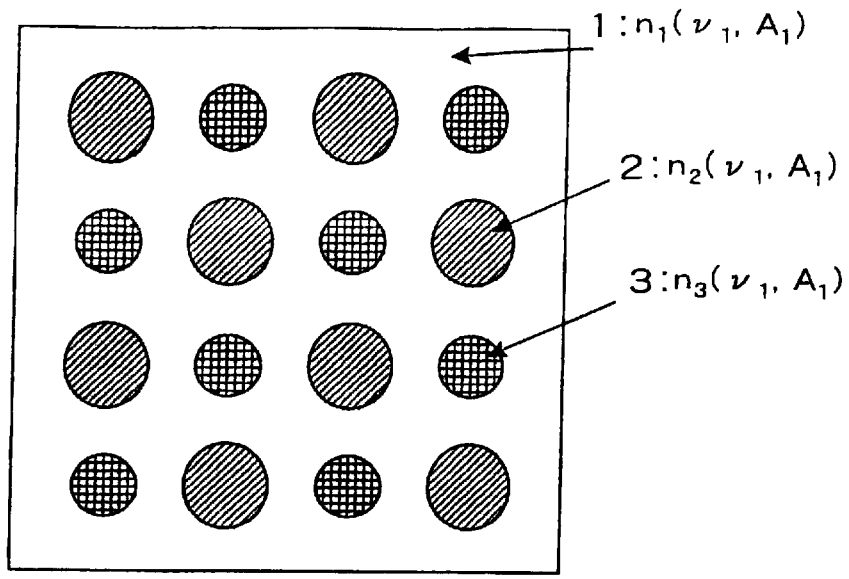
FIG. 9 is a conceptual illustration showing the distribution of refractive index in the photonic crystal.

FIG. 9 is a conceptual illustration exemplifying the case where the refractive indices of three different types of optical media are all different. That is, FIG. 9 shows a structure comprising the first optical medium 1 in which the second optical medium 2 and the third optical medium 3 are arranged periodically. Further, the refractive indices of the first to the third, that is, the first, the second and the third optical media are different from one another. This condition can be expressed by the following expression:

$$n_i(\nu_1, A_1) \neq n_j(\nu_1, A_1)(i \neq j)$$

wherein $n_i$ indicates the refractive index of the jth optical medium. In this case, the band structure in the vicinity of the frequency $\nu_1$, of incident light is determined by both the periodic structure of refractive indices determined by the spacial distributions of (N−1) types of optical media and the refractive indices of all the N types of optical media. FIG. 9 corresponds to the case where N=3.

Next, the external field condition is switched to $A_2$, and the refractive indices of two out of N types of optical media are made equal.

Figure 10:
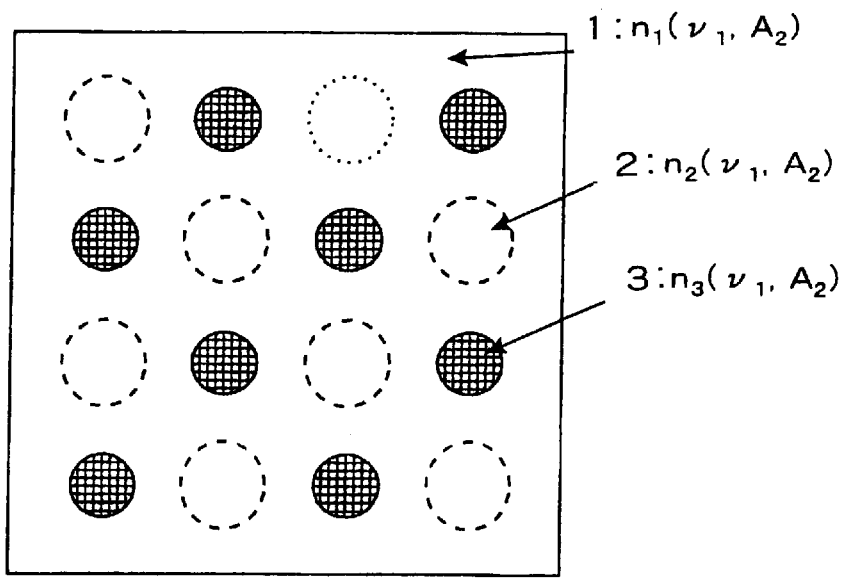
FIG. 10 is a conceptual illustration showing the distribution of refractive index in the photonic crystal.

FIG. 10 is a conceptual illustration exemplifying this condition. For example, when the kth and the lth optical media (k<l) are chosen as the two types of optical media having the same refractive index, this condition can be expressed by the following expression.

$$n_k(\nu_1, A_2) = n_l(\nu_1, A_2)$$

This indicates that the refractive indices of the kth and the lth optical media in the frequency $\nu_1$ of incident light has become equal by switching the external field condition to $A_2$. In this condition, the band structure is determined by the spacial distributions of the lth to the (k−1)th optical media, a combination of the kth and the lth optical media, the (k+1)th to the (l−1)th optical media and the (l+1)th to the Nth optical media and the refractive indices of these optical media. However, since the determination of the spacial distributions of (N−1) types of optical media subsequently determines the spacial distribution of the remaining one type of optical medium, in the end, the band structure is determined by the spacial distributions of (N−2) out of (N−1) types of optical media (the kth and the lth optical media together are counted as one type of optical medium) having (N−1) different refractive indices in the frequency $v_1$ and the values of the refractive indices of (N−1) types of optical media. FIG. 10 shows the case where N=3.

Figure 11:
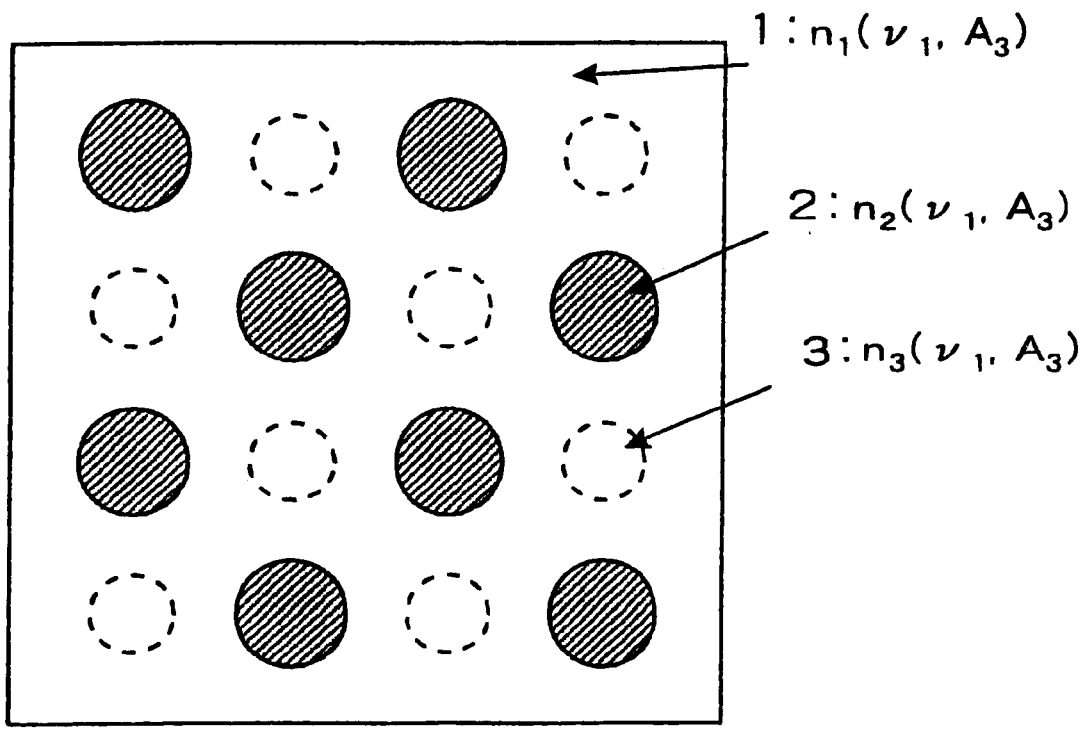
FIG. 11 is a conceptual illustration showing the distribution of refractive index in the photonic crystal.

Next, as exemplified in FIG. 11, a pair of optical media other than the kth and the lth optical media, i.e., the mth and the nth optical media (m<n), is caused to have the same refractive index in the frequency $v_1$ by switching the external field condition to $A_3$. In other words, the following expression is satisfied.

$$n_m(v_1, A_3) = n_n(v_1, A_3)$$

The mth optical medium and the nth optical medium are in contact with each other. In this condition, the band structure is determined by the spacial distributions of the lth to the (m−1)th optical media, a combination of the mth and the nth optical media, the (m+1)th to the (n−1)th optical media and the (n+1)th to the Nth optical media and the refractive indices of these optical media, as exemplified in FIG. 11.

As shown in FIGS. 9 to 11, the spacial arrangement patterns of refractive index distributions that determine the band structure can be switched by switching the external field condition among $A_1$, $A_2$ and $A_3$, that is, between $A_1$ and $A_2$, between $A_2$ and $A_3$, or between $A_1$ and $A_3$. As a result, a larger change can be induced in the band structure of the photonic crystal to incident light as compared with the case where only the values of refractive indices are changed.

Although it has been assumed in the above description that the optical media whose refractive indices have been made equal under the conditions $A_2$ and $A_3$ are in contact with each other, the spacial distribution patterns can be changed even when they are not in contact with each other. This is exemplified by the following description.

FIG. 12 shows a photonic crystal comprising the first, the second and the third optical media and is a conceptual illustration exemplifying the case where the external field condition is switched from $A_1$ to $A_2$. In this case, in the first optical medium 1, the second optical medium 2 and the third optical medium 3 each form a simple cubic lattice whose period is constant and lattice points have the same shape. When the fundamental period vectors of the second and the third optical media are expressed by a, b and c, the lattice points of the second optical medium are deviated from those of the third optical medium for a vector of (a/2, b/2, c/2). When such an optical material is placed under the condition $A_1$, the second optical medium and the third optical medium have different refractive indices. As a result, the crystal structure takes the form of a "cesium chloride-type structure" as shown in FIG. 12(a).

Next, when the external field condition is changed to $A_2$, the second optical medium and the third optical medium appear to be no different for incident light, and the crystal structure becomes equal to a "body-centered cubic lattice structure" as shown in FIG. 12(b). Thus, by switching between the condition $A_1$ and the condition $A_2$, the crystal structure of the photonic crystal to incident light changes.

Next, with reference to FIG. 13, a structure comprising at least three types of optical media as constituents is considered. The three types of optical media are defined as the first optical medium 1, the second optical medium 2 and the third optical medium 3, and the refractive indices thereof to the frequency $v_1$ of controlled light satisfy the following relationships.

$$n_1(v_1, A_1) \neq n_2(v_1, A_1)$$

$$n_2(v_1, A_1) \neq n_3(v_1, A_1)$$

In the first medium, a three-dimensional periodic structure is formed by the second medium. In that case, it is desirable that the photonic crystal formed by the periodic structure open a bandgap to a wide range of directions in the frequency $v_1$ of incident light, and it is particularly desirable to form a diamond structure that opens the bandgap in all directions.

Figure 13A:
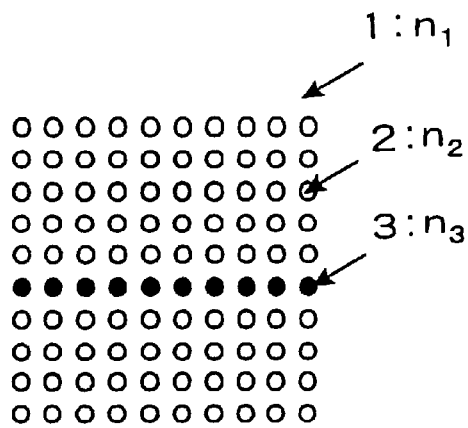
FIG. 13 shows the switching in an optical waveguide.

When some of the second media constituting this periodic structure are substituted with one-dimensionally continuous third optical media as shown in FIG. 13(a), light is trapped in the one-dimensionally continuous spots causing irregularity in the periodicity of the photonic crystal, the light cannot be transmitted in any direction but the direction in which the spots are continuously arranged and, in the end, the spots substituted with the third material function as an optical waveguide.

Next, the external field condition is switched to $A_2$. Under this condition, the refractive indices of the optical media satisfy the relationships represented by the following expressions.

$$n_1(v_1, A_2) \neq n_2(v_1, A_2)$$

$$n_2(v_1, A_2) = n_3(v_1, A_2)$$

Figure 13B:
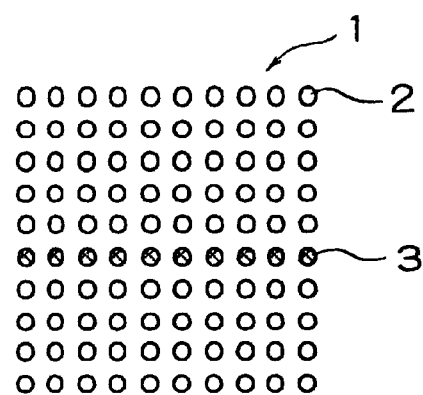

In this case, the second optical medium and the third optical medium appear to be the same to light having a frequency of $v_1$, and the irregularity in the periodicity of the photonic crystal disappears. In other words, the optical waveguide disappears as shown in FIG. 13(b). Thus, by switching between the condition $A_1$ and the condition $A_2$, the function of the waveguide can be made ON/OFF.

Figure 14:
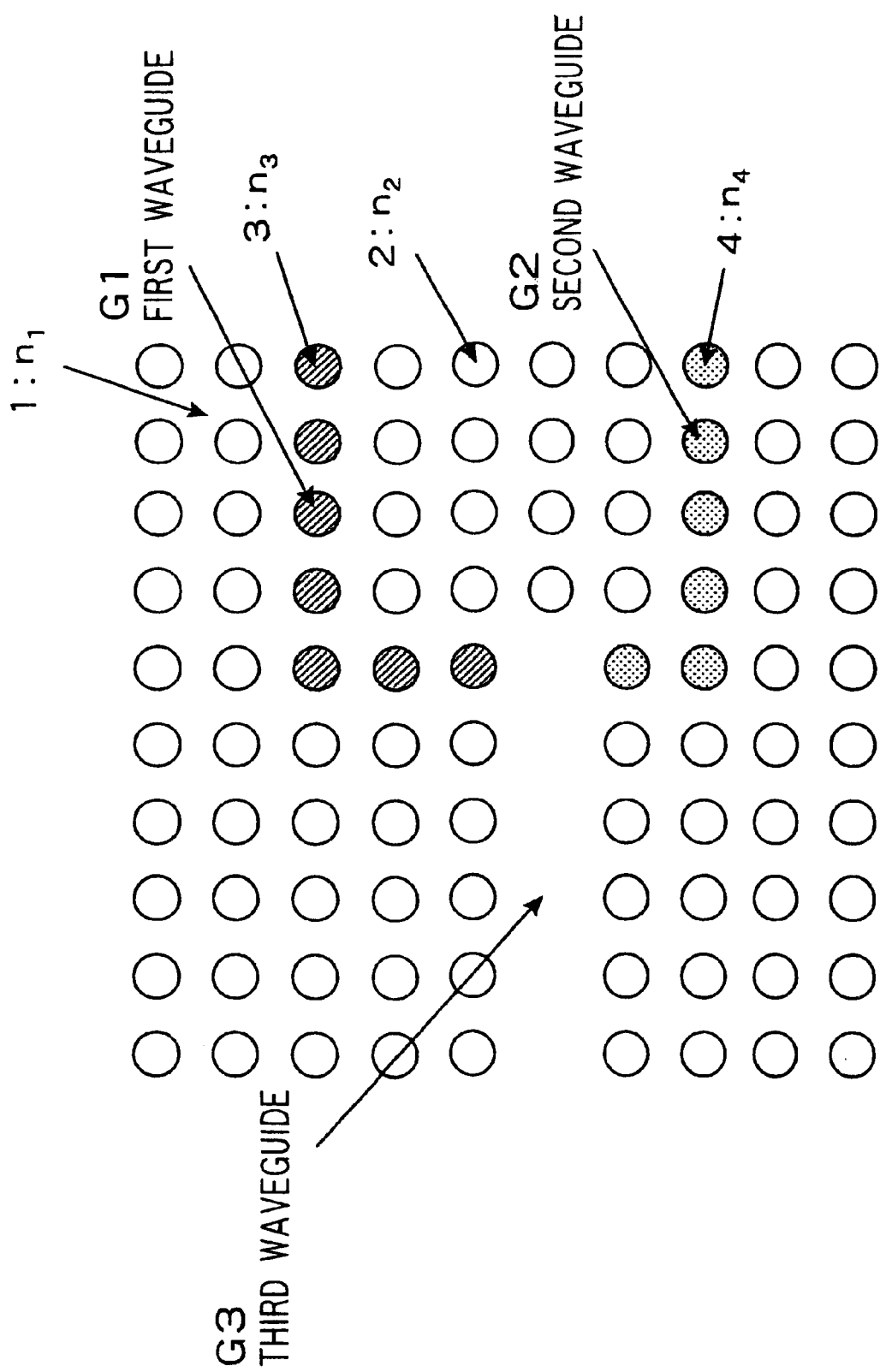
FIG. 14 shows the distribution of refractive index in an optical waveguide which is capable of switching the direction of incident light according to an external field condition.

Next, with reference to FIG. 14, a structure comprising at least four types of optical media as constituents is considered. The four types of optical media are defined as the first optical medium 1, the second optical medium 2, the third optical medium 3 and the fourth optical medium 4, and the refractive indices thereof to controlled light having a frequency of $v_1$, under the condition $A_1$ are expressed as $n_1(v_1, A_1)$, $n_2(v_1, A_1)$, $n_3(v_1, A_1)$ and $n_4(v_1, A_1)$, respectively. Further, these refractive indices satisfy the relationships represented by the following expressions.

$$n_1(v_1, A_1) \neq n_2(v_1, A_1)$$

$$n_2(v_1, A_1) \neq n_3(v_1, A_1)$$

$$n_2(v_1, A_1) \neq n_4(v_1, A_1)$$

At this point, as exemplified in FIG. 14, it is assumed that a three-dimensional periodic structure is formed in the first medium by the second medium. In this case as well, it is desirable that the photonic crystal formed by the periodic structure open a bandgap to a wide range of directions in the frequency $v_1$ of incident light, and it is particularly desirable to form a diamond structure that opens a bandgap in all directions. When some of the second media having this periodic structure are substituted with one-dimensionally continuous third optical media as exemplified in FIG. 14, the one-dimensionally continuous spots causing irregularity in the periodicity of the photonic crystal function as a waveguide, as in the case described with reference to FIG. 13. That is, light attempting to transmit in directions other than the direction in which the third media are continuously arranged is trapped therein to function as an optical waveguide. This waveguide will be called "the first waveguide G1".

Further, when other spots of the second optical media are substituted with one-dimensionally continuous fourth optical media as exemplified in FIG. 14, the spots also function as a waveguide. This waveguide will be called "the second waveguide G2".

Further when one-dimensionally continuous spots causing irregularity in the periodicity of the photonic crystal are formed at still other spots as exemplified in FIG. 14, the spots also function as a waveguide. These spots will be called "the third waveguide G3". These three waveguides are joined together to form a waveguide having a branch.

FIG. 15 is a conceptual illustration showing the behavior of the thus-formed optical element.

First, as shown in the FIG. 15(a), all of the first, the second and the third waveguides function as a waveguide to incident light under the external field condition $A_1$. Therefore, light inputted from the left end of the third waveguide G3 is branched into the first waveguide G1 and the second waveguide G2.

Next, the condition of the optical element is switched to one shown in FIG. 15(b). That is, the external field condition $A_1$ is switched to the external field condition $A_2$ in which the refractive indices satisfy the relationships represented by the following expressions.

$$n_1(v_1, A_2) \neq n_2(v_1, A_2)$$

$$n_2(v_1, A_2) \neq n_3(v_1, A_2)$$

$$n_2(v_1, A_2) = n_4(v_1, A_2)$$

In this case, since $n_2(v_1, A_2)=n_4(v_1, A_2)$, the spots which have functioned as the second waveguide G2 are no longer the spots having irregular periodicity and no longer function as a waveguide. In other words, under the external field condition $A_2$, light transmitted through the third waveguide G3 heads into the first waveguide G1, while it does not head into the second waveguide G2.

Next, the condition of the optical element is switched to one shown in FIG. 15(c). That is, the external field condition $A_2$ is switched to the external field condition $A_3$ in which the refractive indices satisfy the relationships represented by the following expressions.

$$n_1(v_1, A_3) \neq n_2(v_1, A_3)$$

$$n_2(v_1, A_3) = n_3(v_1, A_3)$$

$$n_2(v_1, A_3) \neq n_4(v_1, A_3)$$

In this case, since $n_2(v_1, A_3)=n_3(v_1, A_3)$, the spots which have been the first waveguide G1 no longer function as a waveguide. In other words, under the external field condition $A_3$, light transmitted through the third waveguide G3 does not head into the first waveguide G1, while it heads into the second waveguide G2.

As described above, by switching the condition among $A_1$, $A_2$ and $A_3$, the branching of light transmitting through the optical waveguide can be switched.

Next, with reference to FIG. 16, a description will be given to the operation principle of an optical demultiplexer in which the branch placed in the waveguide behaves differently according to the wavelength of incident light.

As in the case of the waveguide exemplified in FIG. 14, a structure comprising at least four types of optical media as constituents is considered, and the four types of optical media are defined as the first, the second, the third and the fourth optical media. Further, the refractive indices of these optical media in the frequencies $v_1$ and $v_2$ of incident lights under the external field condition $A_1$ are expressed as $n_1(v_1, A_1)$, $n_2(v_1, A_1)$, $n_3(v_1, A_1)$, $n_4(v_1, A_1)$ and $n_1(v_2, A_1)$, $n_2(v_2, A_1)$, $n_3(v_2, A_1)$, $n_4(v_2, A_1)$, respectively.

Further, these refractive indices satisfy the relationships represented by the following expressions.

$$n_1(v_1, A_1) \neq n_2(v_1, A_1)$$

$$n_2(v_1, A_1) \neq n_3(v_1, A_1)$$

$$n_2(v_1, A_1) = n_4(v_1, A_1)$$

$$n_1(v_2, A_1) \neq n_2(v_2, A_1)$$

$$n_2(v_2, A_1) = n_3(v_2, A_1)$$

$$n_2(v_2, A_1) \neq n_4(v_2, A_1)$$

FIGS. 16(a) and 16(b) are conceptual illustrations showing an optical element which has waveguides formed by these optical media and having a branch therein. That is, firstly, a three-dimensional periodic structure is formed by the second medium in the first medium. In this case as well, it is desirable that the photonic crystal formed by the periodic structure open a bandgap to a wide range of directions in the frequencies $v_1$ and $v_2$ of incident lights, and it is particularly desirable to form a diamond structure that opens a bandgap in all directions.

Some of the second media having this periodic structure are substituted with one-dimensionally continuous third optical media, as exemplified in FIG. 16(a). In this case, since $n_2(v_1, A_1) \neq n_3(v_1, A_1)$, for light having a frequency of $v_1$, these spots are spots where the periodicity of the photonic crystal is irregular. These spots trap light having a frequency of $v_1$ that attempts to transmit in directions other than the direction in which the third media are continuously arranged, and function as an optical waveguide. However, for light having a frequency of $v_2$, since $n_2(v_2, A_1)=n_3(v_2, A_1)$, these spots are not spots where the periodicity is irregular and do not function as a waveguide. These spots will be called "the first waveguide G1".

Further, when other portion of the second media is substituted with one-dimensionally continuous fourth optical media as exemplified in FIG. 16(a), since $n_2(v_1, A_1)=n_4(v_1, A_1)$, for light having a frequency of $v_1$, these spots are not spots where the periodicity is irregular and do not function as a waveguide. However, for light having a frequency of $v_2$, since $n_2(v_2, A_1) \neq n_4(v_2, A_1)$, these spots are spots where the periodicity is irregular and function as a waveguide. These spots will be called "the second waveguide G2".

Further, one-dimensionally continuous spots exhibiting irregular periodicity to light having a frequency of $v_1$ and light having a frequency of $v_2$ are formed at still other spots as exemplified in FIG. 16(a) and will be called "the third waveguide G3". The first waveguide G1 and the second waveguide G2 are connected to the third waveguide G3.

As shown in FIG. 16(b), when light having a frequency of $v_1$ and light having a frequency of $v_2$ are inputted to these waveguides from the left end of the third waveguide G3 thereof, the light having a frequency of $v_1$ heads into the waveguide G1 but does not head into the waveguide G2 at the branch. On the other hand, the light having a frequency of $v_2$ does not head into the waveguide G1 but heads into the waveguide G2. Thus, the light having a frequency of $v_1$ and the light having a frequency of $v_2$ which have transmitted through the third waveguide G3 can be branched into the waveguide G1 and the waveguide G2, respectively, according to frequency (wavelength) thereof.

In the above description of the optical element having the above-described waveguides with reference to FIGS. 13 to 16, a one-dimensional waveguide formed in a three-dimensional photonic crystal has been described. The present invention, however, is not limited to a three-dimensional photonic crystal. That is, it can be absolutely equally applied to a waveguide formed by taking advantage of the one-dimensional irregularity in the periodic structure in the photonic crystal having a two-dimensional periodic structure.

Further, the dynamic switching of the photonic-band structures and the switching in the waveguide as described with reference to FIGS. 9 to 16 are achieved not by taking advantage of a mere change in refractive index by an external field, but by taking advantage of the fact that the refractive indices of two optical media out of optical media constituting a photonic crystal or an optical element comprising the photonic crystal can be made equal or almost equal in a certain wavelength by the application of an external field by exploiting varied dependences of the refractive indices of the media on external fields.

Figure 17:
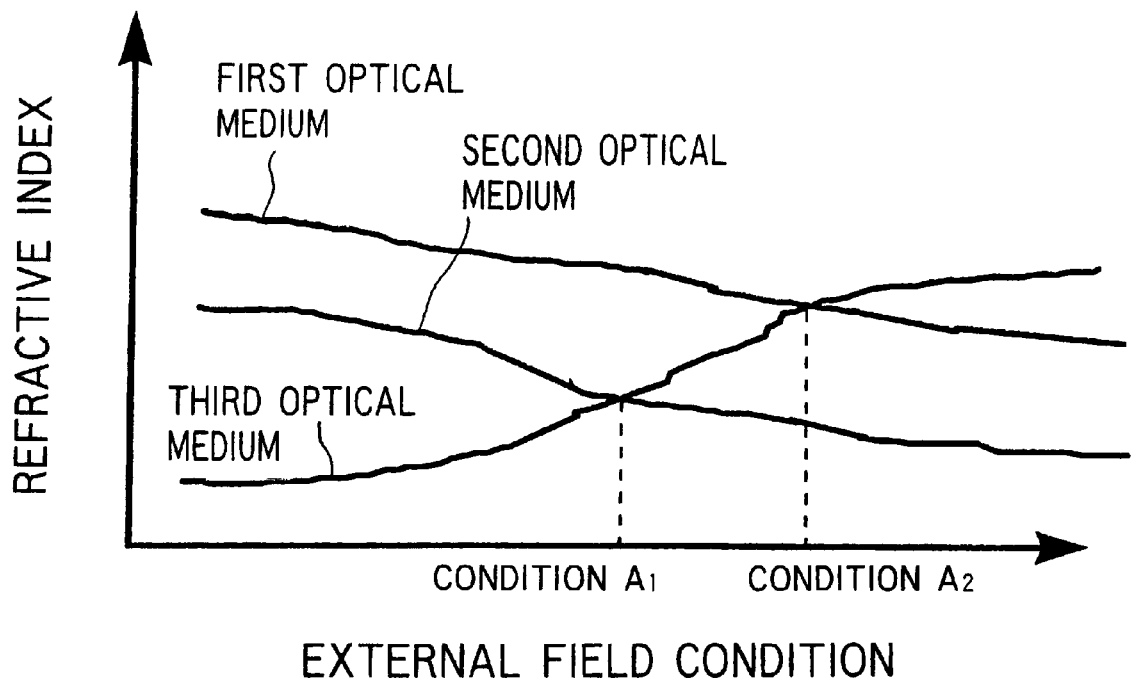
FIG. 17 is a conceptual illustration showing the dependencies of the refractive indices of optical media on external field conditions.

FIG. 17 is a graph exemplifying the dependences of the refractive indices of three types of optical media on external fields. As the external fields can be used an electric field, a magnetic field, light, pressure, temperature and the like. Representative types of these external fields and representative mechanisms in which the application of such external fields induces a change in refractive index to cause switching of the photonic-band structures of the present invention will be enumerated below.

As for an electric field, (a) Stark shift, (b) Franz-Keldish effect, (c) Pockels effect, (d) Kerr effect, and (e) a change in refractive index by a change in orientation (effective for polarization in particular) can be employed.

As for a magnetic field, (a) a change in refractive index caused by the shifting of resonance energy associated with the level division caused by a magnetic field, and (b) Cotton-Mouton effect can be employed.

As for light, (a) optical Stark effect, (b) a change in refractive index associated with population migration caused by optical excitation (absorption saturation), (c) a change in refractive index caused by quantum interference by irradiation of light (Electromagnetically Induced Transparency), (d) a change in refractive index caused by photoisomerization, (e) a change in refractive index caused by a structural change caused by irradiation of light, and (f) a change in refractive index caused by photoionization can be employed.

As for pressure, (a) piezoreflectance effect can be employed.

As for temperature, (a) a change in refractive index associated with the band shift in an electronic structure caused by a change in temperature, (b) a change in refractive index associated with isomerization caused by a change in temperature, and (c) a change in refractive index associated with a structural change caused by a change in temperature can be employed.

In addition, any two or more of the above external fields may be used in combination to induce a change in refractive index effectively. Further, in the present invention, when the photonic crystal is formed of a material in which a change in refractive index to specific polarized light as controlled light is induced by the same mechanism as described above, dynamic switching of photonic-band structures, switching of waveguides and wave branching are possible to the specific polarized light.

The optical elements and optical demultiplexers of examples 5 to 8 of the present invention will be described with reference to the drawings hereinafter.

EXAMPLE 5

To produce the optical element of the present invention, porous silica ($SiO_2$) forming the skeleton of a photonic crystal was prepared. This porous silica had a size of 1 mm×1 mm×1 mm, a porosity of not less than 90%, an average void diameter of 30 nm and a refractive index of 1.015 to 1.055 which was close that of air.

This porous silica was immersed in the ethanol solution of a ruthenium complex to impregnate the porous silica with the ruthenium complex.

Figure 18:
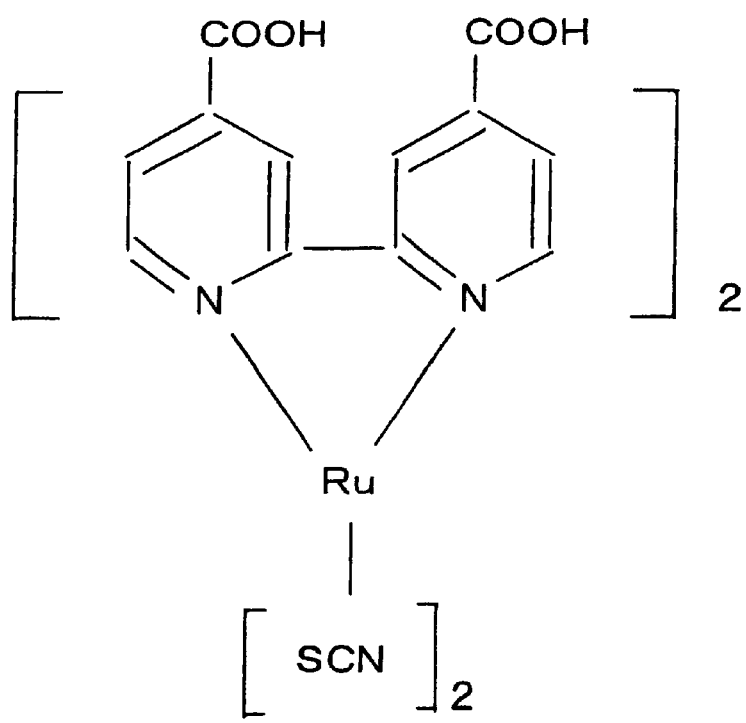
FIG. 18 shows the chemical structure of a ruthenium complex used in an example of the present invention as a catalyst for photopolymerization reaction.

FIG. 18 shows the structural formula of the ruthenium complex. After the porous silica was immersed in the ethanol solution for about 1 hour, it was subjected to heat treatment and reflux to have the ruthenium complex adsorbed to the inner walls of the porous silica. Thereafter, the porous silica was washed with ethanol to wash out the unadsorbed ruthenium complex.

Then, a laser beam having the fourth harmonic (wavelength of 266 nm) from a Q-switched YAG laser was condensed to a spot diameter of about 300 nm through a lens and irradiated to the thus-treated porous silica. In the irradiation, a mirror was controlled by a piezo element-driven system to focus the laser beam on the inside of the porous silica, and the focus point was changed successively to conduct three-dimensional patterning at each focus point. At the focus, the ruthenium complex was decomposed by high-intensity ultraviolet radiation. The patterning was conducted such that the ruthenium complex remained undecomposed should form a face-centered cubic lattice having a lattice constant of 700 nm.

Figure 19:
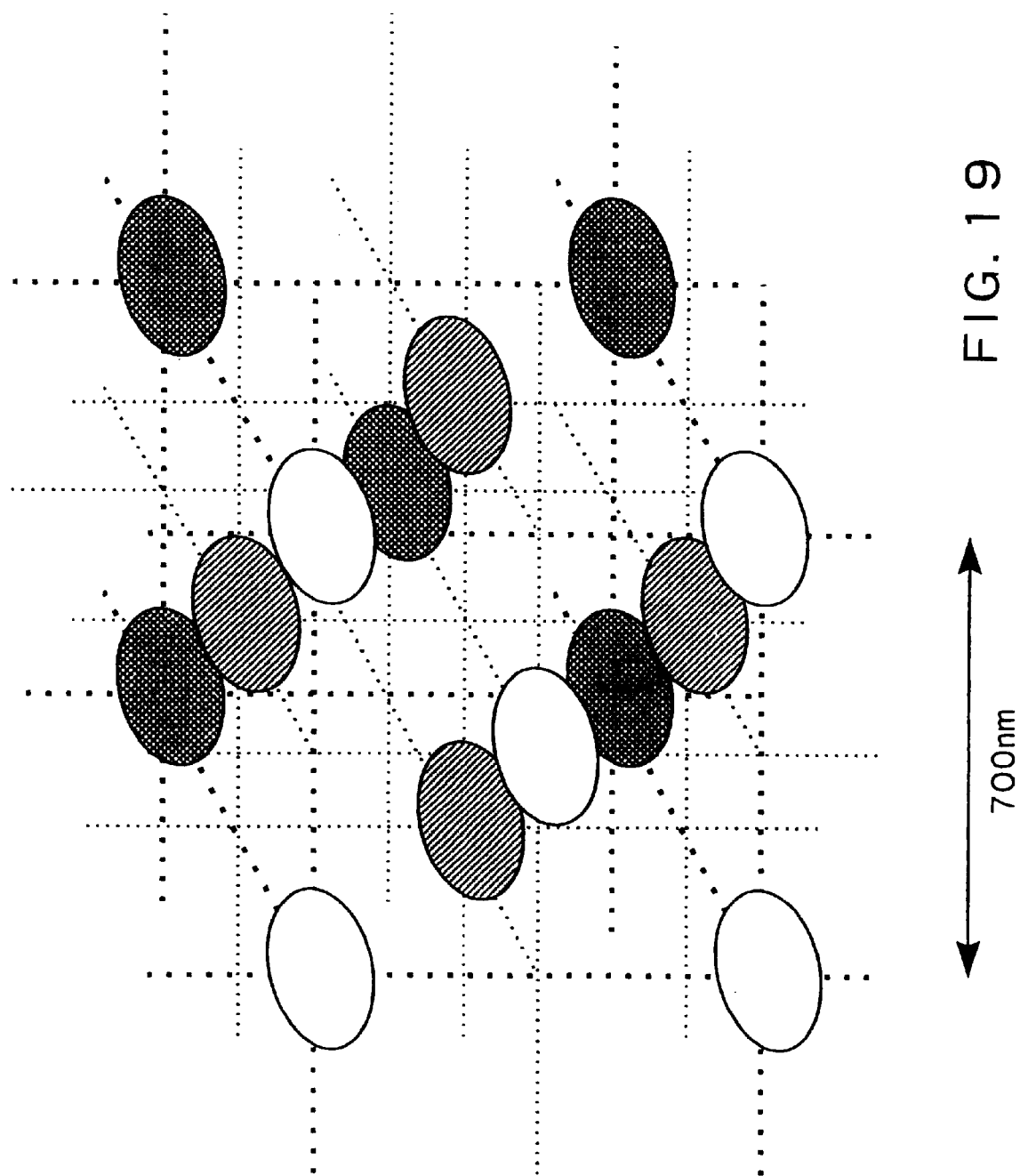
FIG. 19 shows the distribution of the ruthenium complex in porous silica at some point in the process of producing an example of the photonic crystal of the present invention. To be seen clearly, each layer is shadowed differently, starting from the most front layer.

FIG. 19 is a conceptual illustration showing the distribution of the ruthenium complex in the porous silica. As shown in FIG. 19, the ruthenium complexes were formed to form a face-centered cubic lattice. Further, as shown in FIG. 19, the face-centered cubic lattice was formed such that the spots which had not been exposed to the intense ultraviolet radiation at the lattice points of the face-centered cubic lattice should have a rugby-ball shape having a long diameter of about 350 nm and a short diameter of about 300 nm. Further, the axis of the long diameter was directed to the nearest lattice point. By forming the face-centered cubic lattice as such, undecomposed ruthenium complexes remained only at the rugby ball-shaped spots forming the face-centered cubic lattice. To remove the decomposition product of the ruthenium complex in the porous silica, ethanol and methanol were used to wash it out.

Next, this porous silica was immersed in a solution formed by adding 1% of 4-morpholino-2,5-dibutyroxybenzenediazoniumfluoroborate as a photoacid generator to Ceroxide 2021 (trade name, product of Diecel Chemical Co., Ltd.) as an epoxy resin to impregnate the porous silica with this solution.

Thereafter, a laser beam having a wavelength of 407 nm was generated by an excimer laser-excited dye laser. By using the same device as used in the patterning using the beam having a wavelength of 266 nm, the focus was set on the inside of the porous silica impregnated with the epoxy resin, the focus point was changed successively to irradiate the intense beam having a wavelength of 407 nm to the spots forming a face-centered cubic lattice having a lattice constant of 1.4 µm. Further, at the lattice points thereof, the spots irradiated with the intense beam having a wavelength of 407 nm were formed in the shape of a rugby ball having a long diameter of about 450 nm and a short diameter of about 400 nm, and the axis of the long diameter was directed to the nearest lattice point.

By the positioning using markers formed in the porous silica, the patterning using the beam having a wavelength of 407 nm was conducted at positions where the center of the resulting pattern would not coincide with the center of the pattern formed by the beam having a wavelength of 266 nm. Further, this porous silica was heated for 5 hours while maintained at 60° C. By forming the face-centered cubic lattice as such, the spots where the epoxy resin was cured were formed only at the rugby ball-shaped spots forming the face-centered cubic lattice having a lattice constant of 1.4 µm. Thereafter, the porous silica was washed with acetone and methanol to remove the uncured resin and the acid generator.

Next, the thus-treated porous silica was immersed in methyl methacrylate containing 10 wt. % of a dye (product of LAMBDAPHYSIC Co., Ltd., IR26) to impregnate the porous silica with the methyl methacrylate. Thereafter, when a laser beam having a wavelength of 500 nm from an excimer-excited dye laser was directed all over the porous silica, only the methyl methacrylates impregnated in the spots where the ruthenium complex in the porous silica had been adhered were polymerized by the catalytic action of the ruthenium complex. After the photopolymerization, the porous silica was washed with acetone to wash out the unpolymerized methyl methacrylate. As a result, rugby ball-shaped polymethyl methacrylates were formed at the spots forming the face-centered cubic lattice having a lattice constant of 700 nm.

Next, the ruthenium complex was caused to adhere to the spots in the porous silica which were occupied by neither the epoxy resin nor the polymethyl methacrylate by using the ethanol solution, the unadsorbed ruthenium complex was removed by washing, and: the porous silica was immersed in methyl methacrylate containing 2 wt. % of a dye (product of LAMBDAPHYSIC Co., Ltd., IR26) to impregnate the porous silica with the methyl methacrylate. Then, the methyl methacrylate was polymerized by the irradiation of a laser beam having a wavelength of 500 nm.

Figure 20:
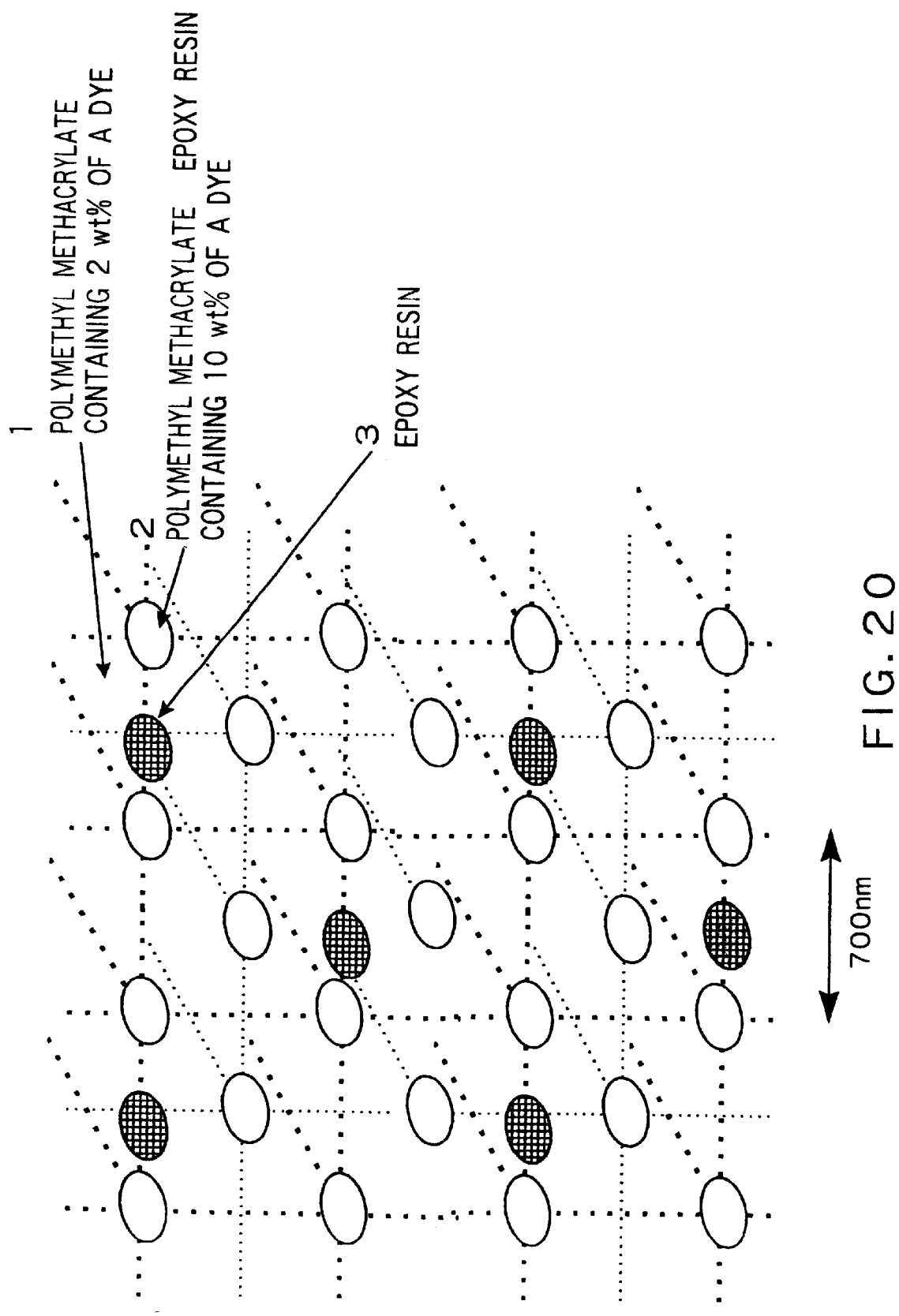
FIG. 20 shows the structure of an example of the photonic crystal of the present invention. Only the first layer is shown.

FIG. 20 is a conceptual illustration showing the structure of the thus-formed photonic crystal. As shown in FIG. 20, the photonic crystal of the present example contains a polymethyl methacrylate 1 containing 2 wt. % of the dye as a matrix, and the matrix 1 comprises a face-centered cubic lattice 2 with a lattice constant of 700 nm which is formed of rugby ball-shaped polymethyl methacrylates containing 10 wt. % of the dye and a face-centered cubic lattice 3 with a lattice constant of 1.4 µm which is formed of epoxy resins.

When the infrared reflection spectrum of this photonic crystal near a wavelength of 1,000 nm was measured, a large reflection peak appeared just around 1,000 nm. This is because the difference in refractive index between the polymethyl methacrylate 2 having 10 wt. % of the dye dispersed therein and the polymethyl methacrylate 1 having 2 wt. % of the dye dispersed therein is larger than the difference in refractive index between the polymethyl methacrylate 1 having 2 wt. % of the dye dispersed therein and the epoxy resin 3, and the photonic-bandgap was formed mainly by the spacial pattern of the polymethyl methacrylates 2 having 10 wt. % of the dye dispersed therein which are arranged in the form of the face-centered cubic lattice having a lattice constant of 700 nm. It is assumed that this caused a region where reflectivity is particularly high to appear around 1,000 nm.

Meanwhile, the reflection spectrum of this photonic crystal near 1,000 nm was measured again by irradiating infrared light having a wavelength of 1,100 nm to this photonic crystal.

Figure 21:
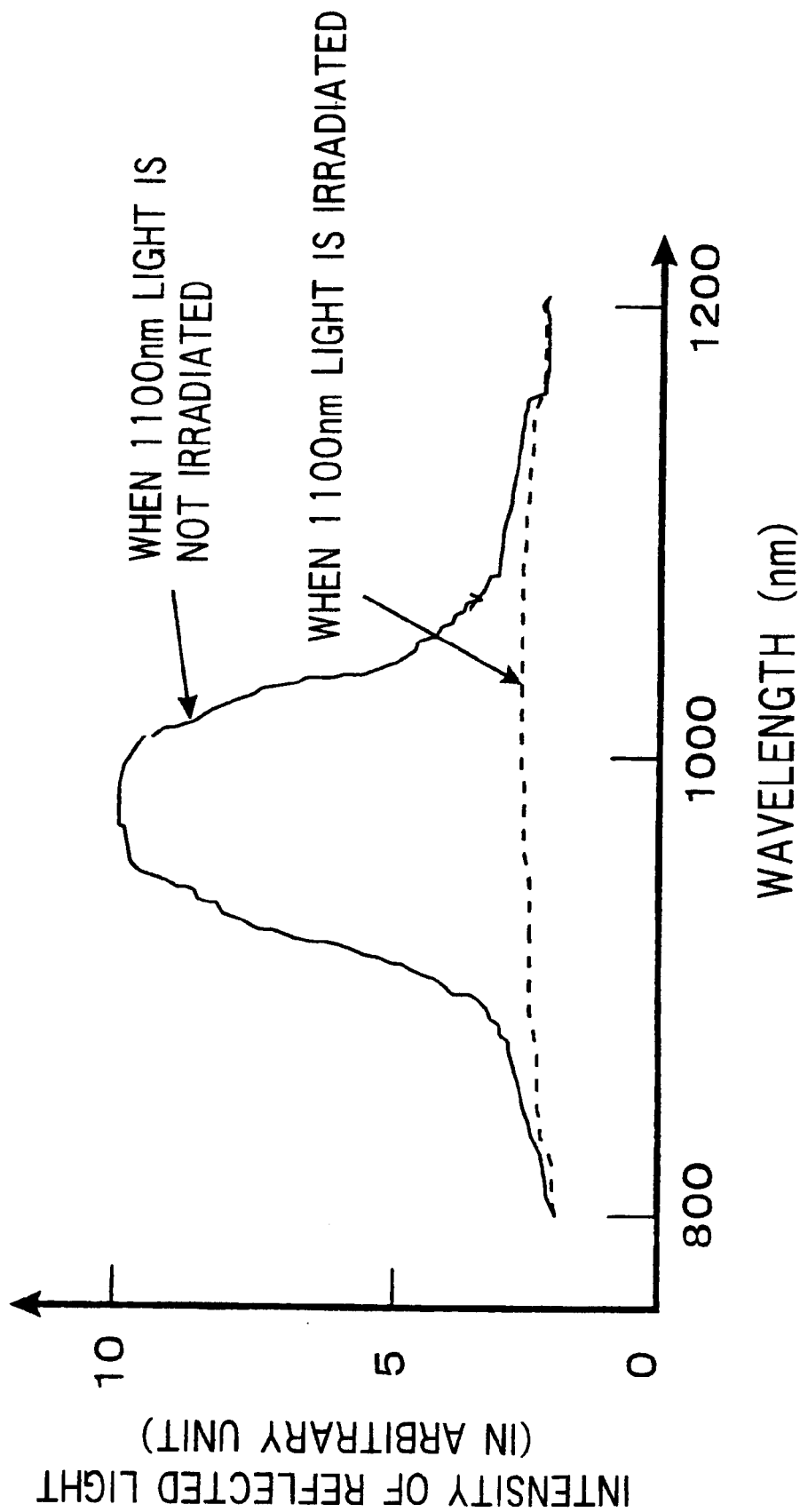
FIG. 21 shows the reflection spectrum of the photonic crystal of FIG. 20.

FIG. 21 shows a graph showing the reflection spectra around 1,000 nm when the infrared light having a wavelength of 1,100 nm was irradiated/not irradiated. As is understood from FIG. 21, when the infrared light having a wavelength of 1,100 nm was irradiated, the large reflection peak which had been seen around 1,000 nm disappeared. It is assumed that this is because the irradiation of the light having a wavelength of 1,100 nm caused absorption saturation in the spots in which the dye had been dispersed, and the difference in refractive index between the polymethyl methacrylate 2 having 10 wt. % of the dye dispersed therein and the polymethyl methacrylate 1 having 2 wt. % of the dye dispersed therein became smaller.

Further, since, under this condition, the difference in refractive index between the polymethyl methacrylate 1 having 2 wt. % of the dye dispersed therein and the epoxy resin is larger than the difference in refractive index between the polymethyl methacrylate 2 having 10 wt. % of the dye dispersed therein and the polymethyl methacrylate 1 having 2 wt. % of the dye dispersed therein in the wavelength rage around 1,000 nm, it is assumed that the photonic-band is formed by the distribution pattern of the epoxy resins 3 forming the face-centered cubic lattice having a lattice constant of 1.4 µm. In fact, a reflection peak was observed around 2,000 nm in the near-infrared region, and it is assumed that this is attributed to the photonic-band formed by the distribution pattern of the epoxy resin 3.

As specifically described above, by forming the photonic crystal from the three types of the optical media 1, 2 and 3, the spacial patterns of the spots which form a photonic-band to a specific wavelength by irradiation of light can be switched, and the optical response can be significantly changed.

It is needless to say that the processes and devices of examples 1 to 4 can be used in the present example.

EXAMPLE 6

Porous silica having the same standard and size as that used in example 5 was immersed in a solution formed by adding 1% of 4-morpholino-2,5-dibutyroxybenzenediazoniumfluoroborate as a photoacid generator to Ceroxide 2021 (trade name, product of Diecel Chemical Co., Ltd.) as an epoxy resin to impregnate the porous silica with this solution. Thereafter, a laser beam having a wavelength of 407 nm was generated by an excimer laser-excited dye laser. By using the same device as used in the patterning in example 5, the focus was set on the inside of the porous silica impregnated with the epoxy resin, the focus point was changed successively to irradiate the intense beam having a wavelength of 407 nm to the spots forming a face-centered cubic lattice having a lattice constant of 1.4 µm. Further, at the lattice points thereof, the spots irradiated with the intense beam having a wavelength of 407 nm were formed in the shape of a rugby ball having a long diameter of 450 nm and a short diameter of 400 nm, and the axis of the long diameter was directed to the nearest lattice point. After at least 10 layers of lattice points were formed in the porous silica, this porous silica was heated for 5 hours while maintained at 60° C. Thereafter, the porous silica was washed with acetone and methanol to remove the uncured resin and the acid generator.

Next, the thus-treated porous silica was immersed in a Ceroxide 2021 (product of Diecel Chemical Co., Ltd.) epoxy resin containing 10 wt. % of a dye (product of LAMBDAPHYSIC Co., Ltd., IR26) and 1 wt. % of 4-morpholino-2,5-dibutyroxybenzenediazoniumfluoroborate to impregnate the porous silica with the dye-containing epoxy resin. Thereafter, by the precise positioning using markers formed in the porous silica, the sample was set again in the patterning device using a laser beam having a wavelength of 407 nm, the beam was directed onto the spots corresponding to one-dimensionally continuous lattice points on the previously-formed top layer of the face-centered cubic lattice in such a manner that is consistent with the top layer, so as to cause the spots irradiated with the beam having a wavelength of 407 nm to take a rugby-ball shape having a long diameter of 450 nm and a short diameter of 400 nm and the direction of the axis of the long diameter to be consistent with the direction of the long axis of the lattice point forming the underlying face-centered cubic lattice.

Figure 22:
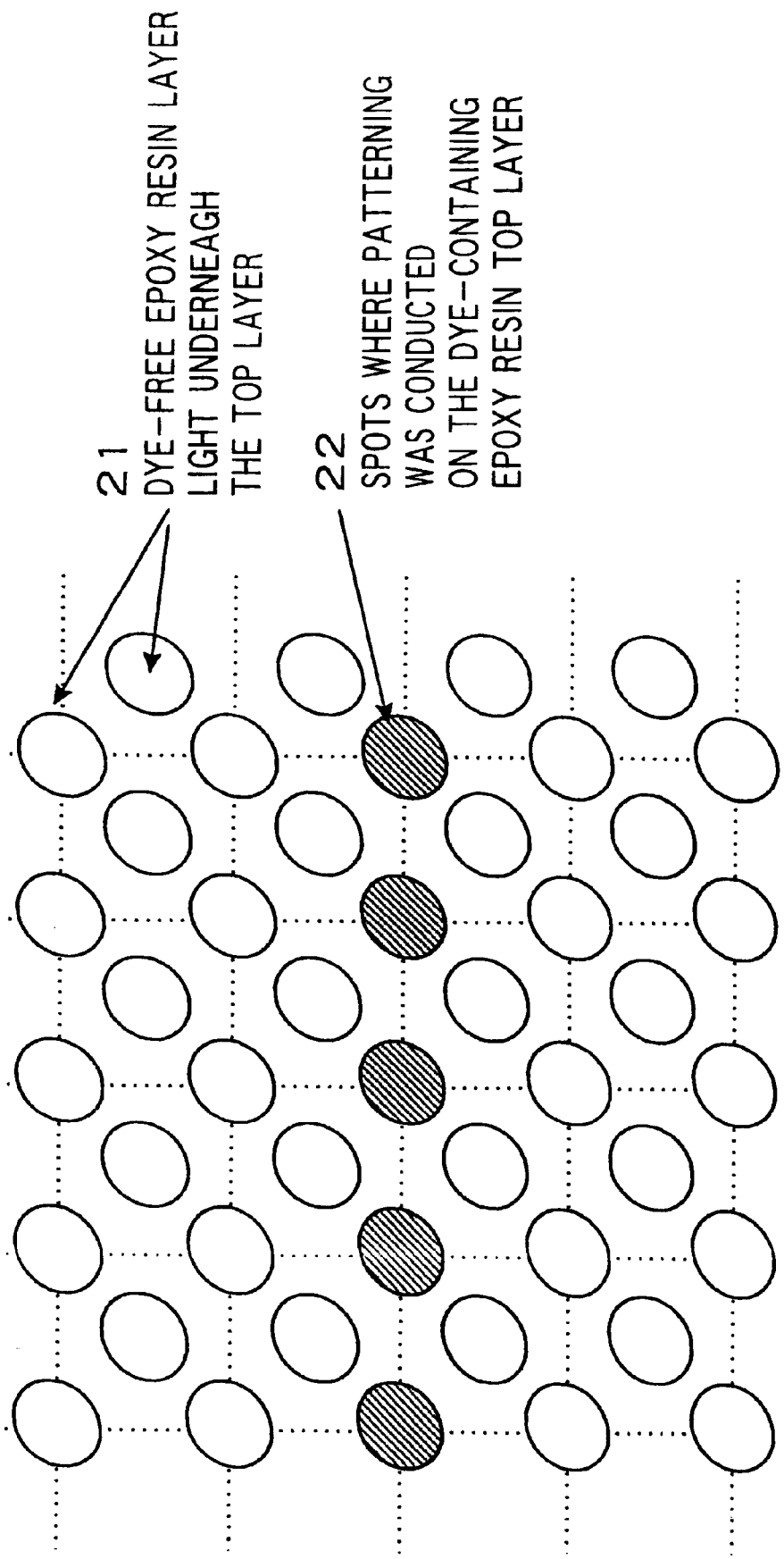
FIG. 22 shows the arrangement of dye-containing epoxy resins at some point in the process of producing an example of the optical waveguide in the photonic crystal of the present invention.

FIG. 22 is a conceptual illustration showing the thus-formed structure. As shown in FIG. 22, the spots 22 where patterning with the dye-containing epoxy resin was conducted are formed one-dimensionally on the layer 21 of the dye-free epoxy resin.

After this dye-containing lattice point 22 was formed to occupy one line, this porous silica was heated for 5 hours again while maintained at 60° C. Thereafter, the porous silica was washed with acetone and methanol to remove the uncured resin and the acid generator.

Next, the thus-treated porous silica was immersed in a Ceroxide 2021 (product of Diecel Chemical Co., Ltd.) epoxy resin containing 1 wt. % of 4-morpholino-2,5-dibutyroxybenzenediazoniumfluoroborate to impregnate the porous silica with the epoxy resin.

Thereafter, by the precise positioning using markers formed in the porous silica, the sample was set again in the patterning device using a laser beam having a wavelength of 407 nm, and 10 or more layers of lattice points forming a face-centered cubic lattice were formed over a line of the dye-containing epoxy resins 22 by irradiating the beam successively while moving the focus point in such a manner that is consistent with the previously-formed face-centered cubic lattice 21 and a line of the epoxy resins 22 formed thereon. In the formation of the layers, the spots irradiated with the intense beam having a frequency of 407 nm were caused to take a rugby-ball shape having a long diameter of 450 nm and a short diameter of 400 nm at the lattice points, and the direction of the axis of the long diameter was made consistent with the direction of the long axis of the lattice point constituting the underlying face-centered cubic lattice.

Thereafter, this porous silica was heated for 5 hours again while maintained at 60° C., and the porous silica was then washed with acetone and methanol to remove the uncured resin and the acid generator.

Figure 23:
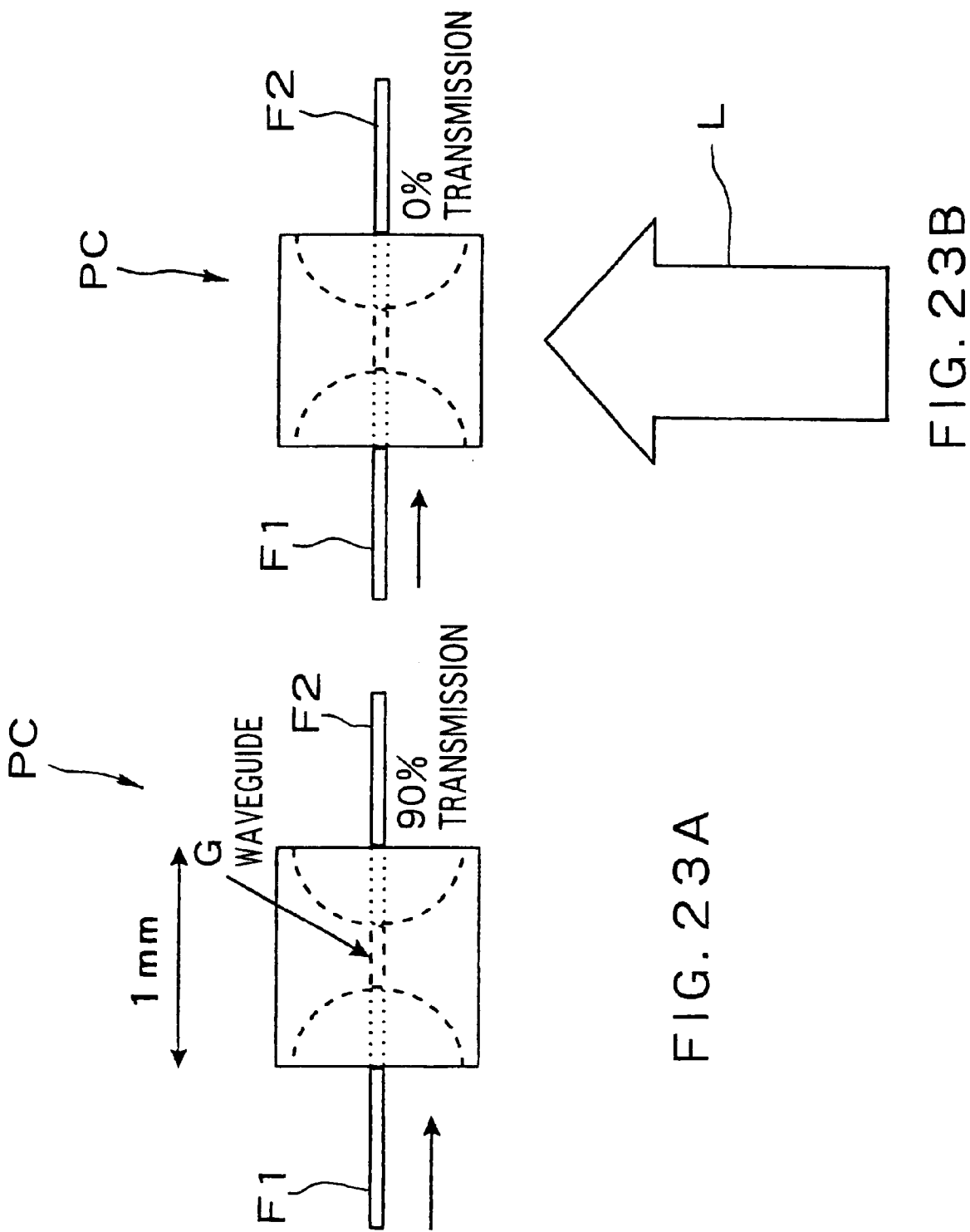
FIG. 23 shows the switching behavior in an example of the optical waveguide in the photonic crystal of the present invention.

FIG. 23 is a conceptual illustration showing the evaluation method of the function of the waveguide in the thus-obtained photonic crystal.

First, as shown in FIG. 23(a), the porous silica was shaved in such a manner that the ends of one-dimensionally-continuous dye-containing epoxy resins in a photonic crystal PC should be exposed, and optical fibers F1 and F2 were connected to each end thereof, respectively. When a laser beam having a wavelength of 1,000 nm was inputted in this fiber F1, it was observed that a beam whose intensity was equal to 90% of the intensity of the inputted beam was being outputted from the fiber F2 located at the other side of the photonic crystal PC. That is, it was confirmed that the one-dimensionally-continuous dye-containing epoxy resins were the spots where periodicity was irregular in the photonic crystal PC and functioned as an optical waveguide G.

Next, as shown in FIG. 23(b), when a laser beam L having a wavelength of 1,100 nm was irradiated to the photonic crystal PC while its intensity was gradually changed, the intensity of the beam outputted from the fiber F2 became zero when the intensity of the laser beam L reached a certain level. It is assumed that this is because the refractive indices of the lattice points formed of the dye-containing epoxy resin were changed by the irradiation of the beam, whereby the difference in refractive index between these lattice points and the dye-free lattice points was cleared, with the result that the one-dimensionally-continuous dye-containing epoxy resins became unable to function as the waveguide G.

As specifically described above, according to the present example, an optical waveguide exhibiting a switching function by the irradiation of a beam having a wavelength of 1,100 nm was formed.

EXAMPLE 7

An optical element having a waveguide formed in a photonic crystal was produced by using porous silica having the same standard and size as that used in example 6 and the same patterning process as used in example 6.

Figure 24:
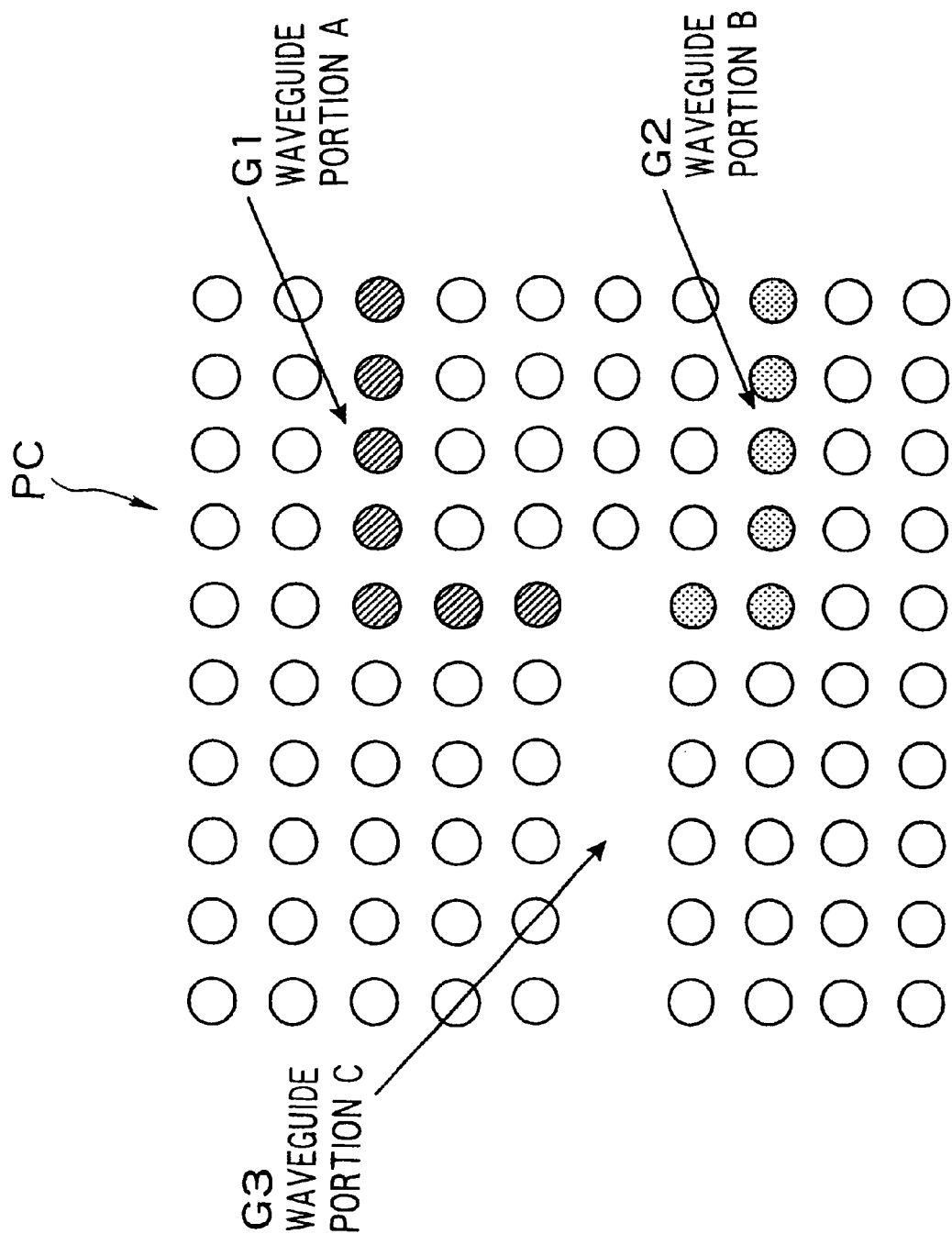
FIG. 24 shows the connection of waveguides in an example of the optical waveguide in the photonic crystal of the present invention.

FIG. 24 is a conceptual illustration showing the structure of the photonic crystal PC formed in the present example. In the present example, as spots where periodicity was irregular, there were formed a waveguide (to be referred to as "waveguide G1" hereinafter) comprising lattice points formed of an epoxy resin containing 10 wt. % of a dye (product of LAMBDAPHYSIC Co., Ltd., IR26) having an absorption peak around 1,100 nm, a waveguide (to be referred to as "waveguide G2" hereinafter) formed of an epoxy resin containing a dye (product of LAMBDAPHYSIC Co., Ltd., IR132) having an absorption peak around 850 nm, and a waveguide (to be referred to as "waveguide G3" hereinafter) comprising one-dimensionally continuous points where lattice points were supposed to be formed by the epoxy resin but were not formed on purpose. These waveguides were connected to one another in the photonic crystal as shown in FIG. 24. of the three waveguides G1 to G3, a laser beam having a wavelength of 1,000 nm lead by an optical fiber was inputted in the left end of the waveguide G3. At this point, a laser beam having a wavelength of 850 nm was directed all over the photonic crystal PC. When the beams outputted from the ends of the waveguides G1 and G2 were measured, it was found that at least 80% of the inputted laser beam was outputted from the waveguide G1. It is assumed that this was attributed to the following mechanism.

That is, under this condition, the wavelength of the inputted 1,000-nm beam is located at the higher energy side of the absorption peak wavelength of 1,100 nm with regard to the waveguide G1 and present in a spectral region exhibiting a lower refractive index that the refractive index when only an epoxy resin is used. Meanwhile, with regard to the waveguide G2, the wavelength of the inputted 1,000- nm beam is present in a spectral region where the refractive index at the lower energy side of the absorption peak wavelength of 850 nm is higher. However, since the waveguide G2 is highly excited by the laser beam having a wavelength of 850 nm and, along with absorption saturation, the refractive index has been made close to the refractive index when only an epoxy resin is used, the inputted beam can hardly recognize the waveguide G2 as the portion where the periodicity of the refractive index is irregular. Therefore, the waveguide that actually functions is only the waveguide G1 that the inputted beam recognizes as the portion where the periodicity of refractive index is irregular.

Next, a laser beam having a wavelength of 1,100 nm was irradiated all over the photonic crystal PC in place of the laser beam having a wavelength of 850 nm. When the outputted beams having a wavelength of 1,000 nm from the ends of the waveguides G1 and G2 were measured under this condition, it was found that at least 80% of the inputted laser beam was outputted from the waveguide G2. It is assumed that this was attributed to the following mechanism.

That is, under this condition, the wavelength of the inputted 1,000-nm beam is located at the lower energy side of the absorption peak wavelength of 850 nm with regard to the waveguide G2 and present in a spectral region exhibiting a higher refractive index that the refractive index when only an epoxy resin is used. Meanwhile, with regard to the waveguide G1, the wavelength of the inputted 1,000-nm beam is present in a spectral region where the refractive index at the higher energy side of the absorption peak wavelength of 1,100 nm is lower. However, since the waveguide G1 is highly excited by the laser beam having a wavelength of 1,100 nm and, along with absorption saturation, the refractive index has been made close to the refractive index when only an epoxy resin is used, the inputted beam can hardly recognize the waveguide G1 as the portion where the periodicity of the refractive index is irregular. Therefore, the waveguide that actually functions is only the waveguide G2 that the inputted beam recognizes as the portion where the periodicity of refractive index is irregular.

As specifically described above, according to the present example, the direction of light proceeding in the waveguides could be switched by changing the wavelength of the light directed onto the optical medium.

EXAMPLE 8

An optical element having a waveguide formed in a photonic crystal was produced by using porous silica having the same standard and size as that used in example 7 and the same patterning process as used in example 7.

In the present example, as spots where periodicity was irregular, there were formed a waveguide (to be referred to as "waveguide G1" hereinafter) comprising lattice points formed of an epoxy resin containing 10 wt. % of a dye (product of LAMBDAPHYSIC Co., Ltd., Cresyl Violet) having an absorption peak around 600 nm, a waveguide (to be referred to as "waveguide G2" hereinafter) formed of an epoxy resin containing a dye (product of LAMBDAPHYSIC Co., Ltd., Coumarin 334) having an absorption peak around 450 nm, and a waveguide (to be referred to as "waveguide G3" hereinafter) comprising one-dimensionally continuous points where lattice points were supposed to be formed by the epoxy resin but were not formed on purpose. These waveguides were connected to one another in the same arrangement in the photonic crystal as in the case of example 7.

Of the three waveguides G1 to G3, laser beams having wavelengths of 700 nm and 500 nm lead by an optical fiber were inputted in the left end of the waveguide G3. When the beams outputted from the ends of the waveguides G1 and G2 were measured, it was found that at least 80% of the inputted laser beam having a wavelength of 700 nm was outputted from the waveguide G1 and at least 80% of the inputted laser beam having a wavelength of 500 nm was outputted from the waveguide G2.

This is because the portion of the waveguide that is formed of the dye-containing epoxy resin exhibiting a high refractive index for the beam having a wavelength of 700 nm differently from other epoxy resin spots is the waveguide G1, while the portion of the waveguide that is formed of the dye-containing epoxy resin exhibiting a high refractive index for the beam having a wavelength of 500 nm differently from other epoxy resin spots is the waveguide G2.

As described above, according to the present examples 5 to 8, an optical element that switched the heading direction of light according to wavelength and functioned as an optical demultiplexer was obtained.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

The entire disclosure of Japanese Patent Applications No. H11-271378 filed on Sep. 24, 1999 and No. H11-280043 filed on Sep. 30, 1999 including specifications, claims, drawings and summaries are incorporated herein by references in their entirety.

What is claimed is:

1. A process for producing an optical element including a photonic crystal in which spots having a refractive index different from that of their surroundings are periodically arranged, said process comprising:

creating a first optical field having a three-dimensional periodic structure in which an intensity of light spacially changes at a first period of an order of a wavelength of the light, said three-dimensional periodic structure having lattice points in which the intensity of light is higher than a light intensity of said surroundings;

exposing an optical medium, whose refractive index is changed by an intensity of irradiated light or by a predetermined treatment conducted after light irradiation, to said first optical field during a given period;

moving the optical medium as much as a minute distance of the order of the wavelength of the light in the first optical field in a direction which is not parallel to any one of three directions defined by three different lines connecting a lattice point of said three-dimensional structure to three lattice points adjoining to said lattice point; and exposing the optical medium to a second optical field where a light intensity spacially changes at a second period of an order of a wavelength of a light.

2. The process according to claim 1, wherein the refractive index of said optical medium is changed in accordance with an intensity of an irradiated light by a lapse of a predetermined time after the irradiation of the light or by a heat treatment, or by an irradiation of electromagnetic wave or corpuscular radiation, or by a treatment with a chemical after the irradiation of light.

3. The process according to claim 2, further comprising forming the photonic crystal having a spacial distribution of a refractive index in accordance with the intensity of the irradiated light by treating the optical medium with a chemical.

4. The process according to claim 3, wherein said optical medium is a porous material with a photopolymerizable monomer impregnated thereinto, and the impregnated photopolymerizable monomer at a portion where an intensity of the irradiated light is lower than the reminder is removed by the treatment of the chemical in said forming step.

5. The process according to claim 1, wherein at least one of the first optical field and the second optical field is created by the interference of laser beams.

6. The process according to claim 5, wherein at least one of the first optical field and the second optical field is created by a standing wave generated by the interference of a laser beam propagating in a first direction and a laser beam propagating in a second direction opposite to said first direction.

7. The process according to claim 6, wherein said laser beam propagating in a second direction is made by reflecting said laser light propagating in said first direction.

8. The process according to claim 1, wherein the changing step includes placing the optical medium on a stage moved by a piezoelectric element in three directions which are not parallel to one another, and shifting a position of the optical medium as much as a minute distance of an order of a wavelength of the light in the first optical field.

9. The process according to claim 1, wherein at least one of the first optical field and the second optical field is created by forming spots having a higher intensity of light at each lattice point of a three-dimensional lattice.

10. The process according to claim 9, wherein a distribution of the intensity of the light at the spots is anisotropic.

11. The process according to claim 10, wherein the distribution of the intensity of the light at the spots have a shape extended in three directions which are not parallel to one another.

12. The process according to claim 1, wherein the first optical field and the second optical field have essentially the same period.

13. The process according to claim 1, wherein the first optical field and the second optical field are different in an intensity of the light.

14. A device for producing an optical element, comprising:
   an optical system which creates an optical field having a three-dimensional periodic structure in which a light intensity changes in space at a period of an order of a wavelength of the light, said three-dimensional periodic structure having lattice points in which the intensity of light is higher than a light intensity of said surroundings; and
   a movable stage which holds an optical medium whose refractive index is changed by an intensity of an irradiated light, in the optical field where light intensity periodically changes and which shifts the optical medium as much as a minute distance of the order of the wavelength of the light in the optical field in a direction which is not parallel to any one of the three directions defined by three different lines connecting a lattice point of said three-dimensional structure to three lattice points adjoining to said lattice point.

15. The device according to claim 14, wherein said movable stage moves by a piezoelectric element.

16. The device according to claim 14, wherein the optical field is created by an interference of laser beams.

17. The device according to claim 16, wherein the optical field is created by a standing wave generated by the interference of a laser beam propagating in a first direction and a laser beam propagating in a second direction opposite to said first direction.

18. The device according to claim 17, wherein said laser beam propagating in a second direction is made by reflecting said laser light propagating in said first direction.

19. The device for producing the optical element according to claim 14, further comprising: a light source and a detector for evaluating the produced optical element.

* * * * *